United States Patent [19]

Lundgren

[11] Patent Number: 4,837,779
[45] Date of Patent: Jun. 6, 1989

[54] COMMUNICATOR AND COMMUNICATION METHOD AND SYSTEM

[75] Inventor: Paul R. Lundgren, Newtown, Conn.

[73] Assignee: Dual-Lite Manufacturing, Inc., Naguabo, P.R.

[21] Appl. No.: 180,942

[22] Filed: Apr. 12, 1988

[51] Int. Cl.$^4$ ............................................. H04Q 5/14
[52] U.S. Cl. ..................... 375/10; 340/636; 340/825.55; 375/36; 375/121
[58] Field of Search ............... 375/7, 10, 36, 106, 375/121; 370/79, 84, 100, 119; 340/825.06, 825.08, 825.14, 825.54, 825.55, 636; 178/1, 2 R

[56] References Cited

U.S. PATENT DOCUMENTS

| | | | |
|---|---|---|---|
| 3,143,666 | 8/1964 | Aaronson | 307/269 |
| 3,389,381 | 6/1968 | Foster | 364/900 |
| 3,623,003 | 11/1971 | Hewitt | 340/825.54 |
| 3,806,872 | 4/1974 | Odom | 340/825.55 |
| 4,064,486 | 12/1977 | Faber | 340/825.14 |
| 4,187,394 | 2/1980 | Sievers | 370/108 |
| 4,253,181 | 2/1981 | Watten | 370/103 |
| 4,301,507 | 11/1981 | Soderberg et al. | 364/464 |
| 4,308,619 | 12/1981 | Hughes | 375/119 |
| 4,375,103 | 2/1983 | Arneth et al. | 375/121 |
| 4,694,472 | 9/1987 | Torok et al. | 375/107 |

*Primary Examiner*—Benedict V. Safourek
*Attorney, Agent, or Firm*—Mattern, Ware, Stoltz & Fressola

[57] ABSTRACT

A communication method and system for determining the transmission speed of a communicating remote unit with respect to a host communicator. The communication method uses a start of message header containing a known number of timing intervals, called ticks, with the header transmission in a logic one or a logic zero state. A start of message header is detected by the host communicator and its logic one state is sampled after a given period of time in order to determine its actual logic one duration. From this, the actual tick time is determined so as to be able to determine data "1" bits and data "0" bits from the remote unit by sampling the incoming data at precise intervals of time so as to properly determine the data bit states. A logic zero to logic one state transition at the start of each data bit is used to reset the communicator tick timer.

The invention further comprises such a communicator which is able to interrogate one or more remote units, each remote unit having the capability of reporting its status as well as initiating self-discharge tests under commands from the host communicator. The incoming status information to the host communicator is then displayable by means of a printer.

38 Claims, 12 Drawing Sheets

FIG. 2C
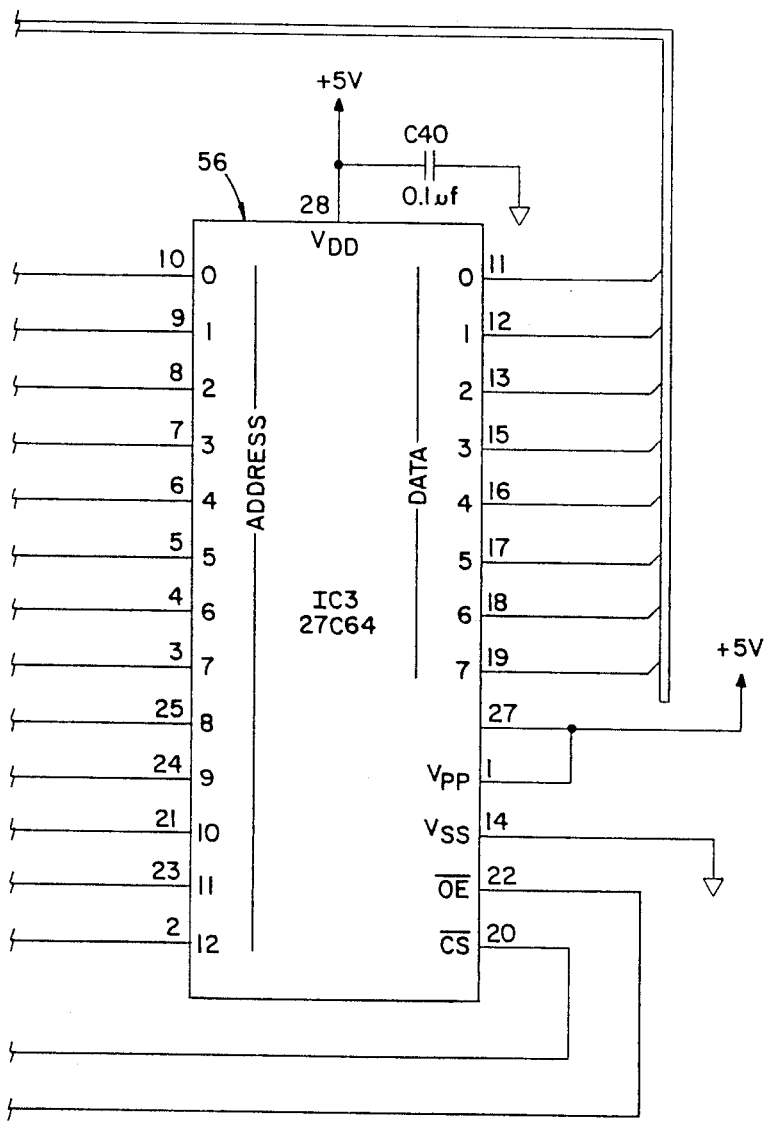
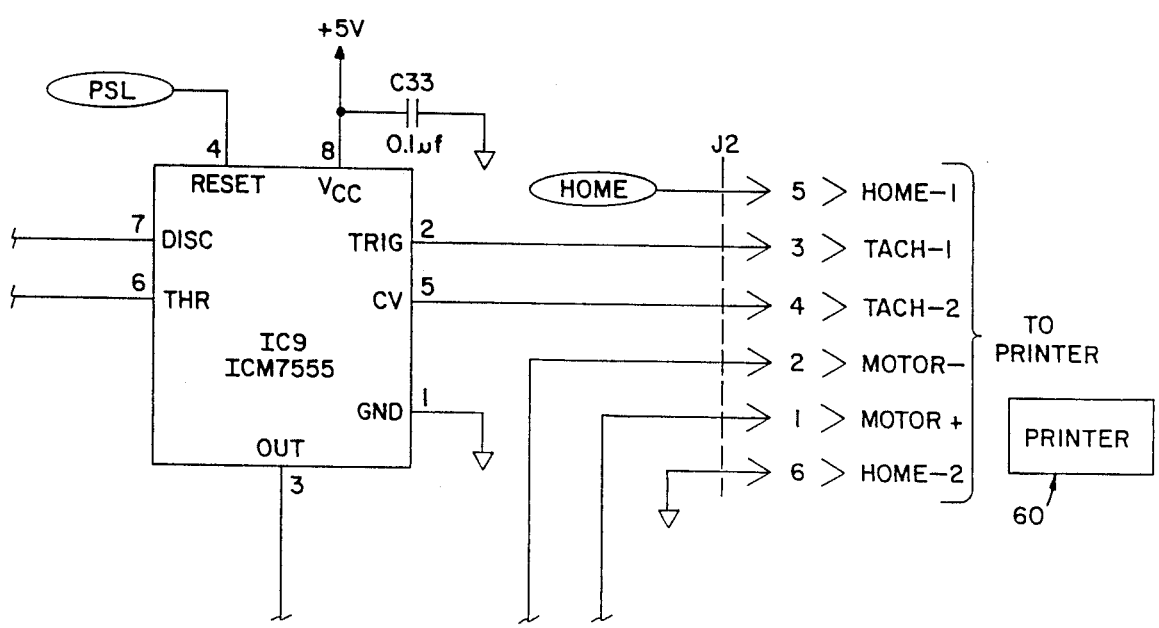

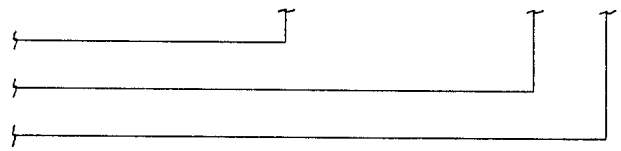
FIG. 2F
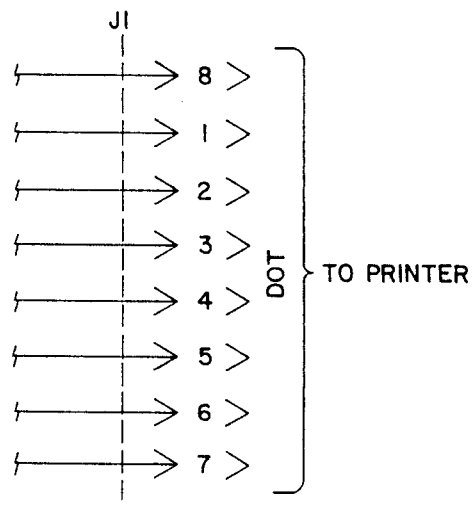
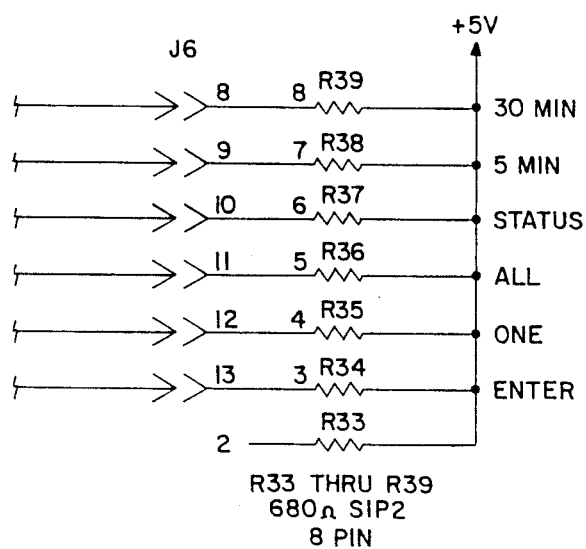
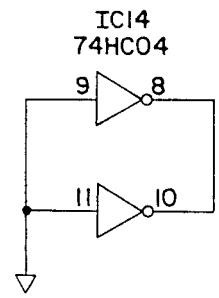
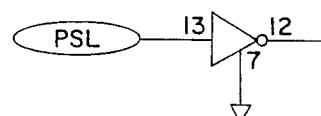

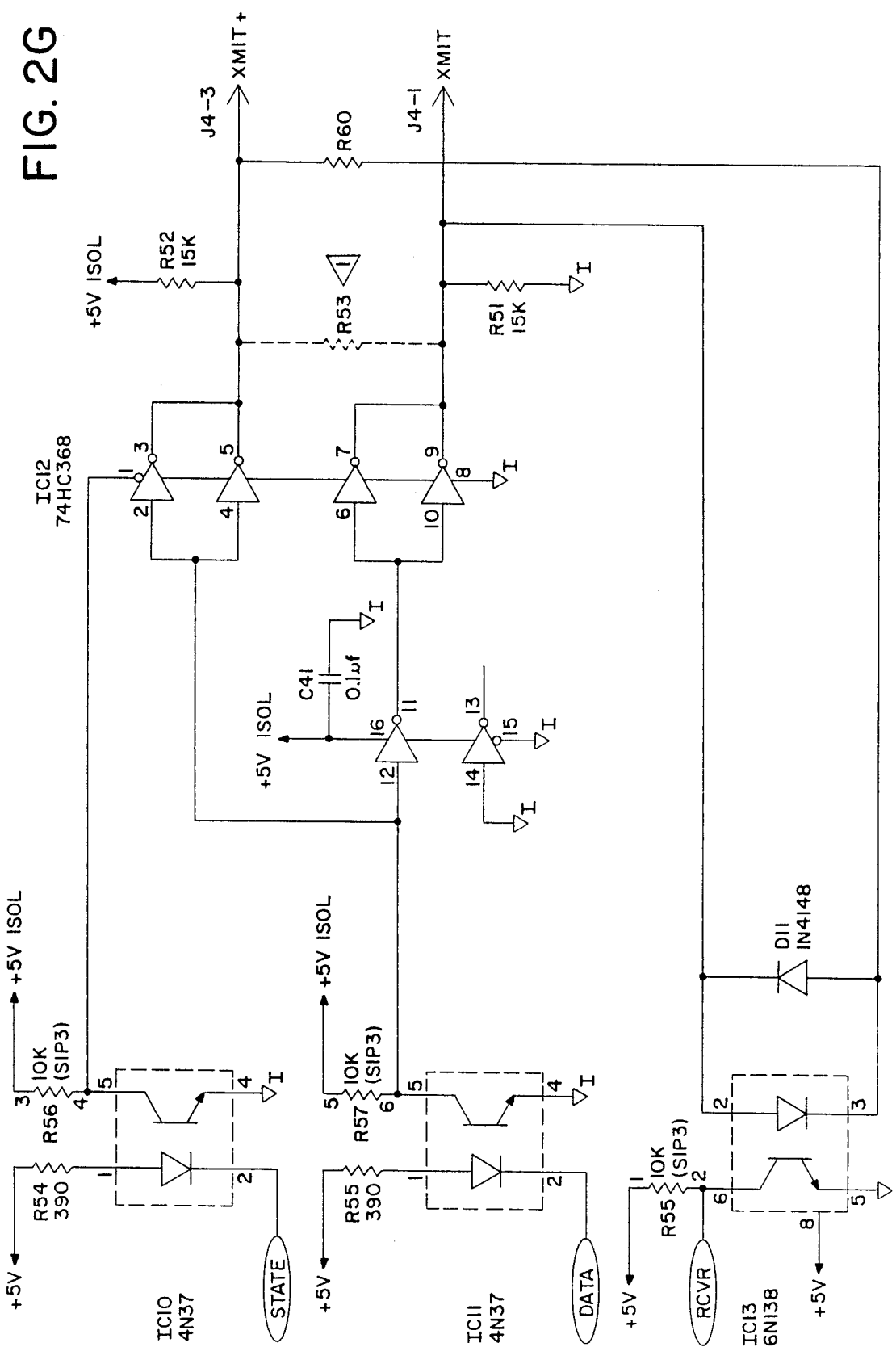

FIG. 5
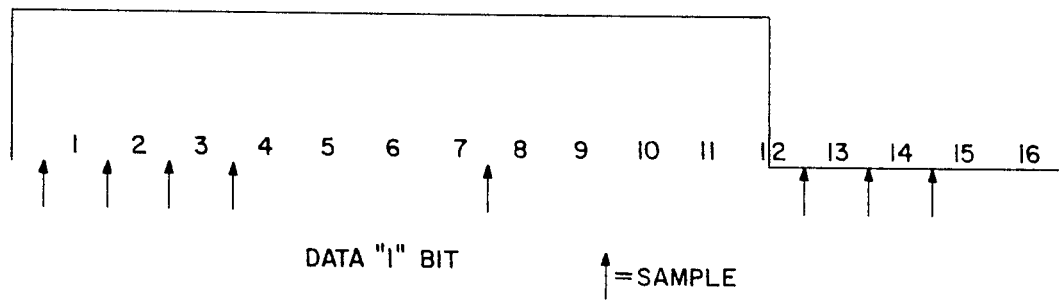
DATA "1" BIT    ↑ = SAMPLE
FIG. 6
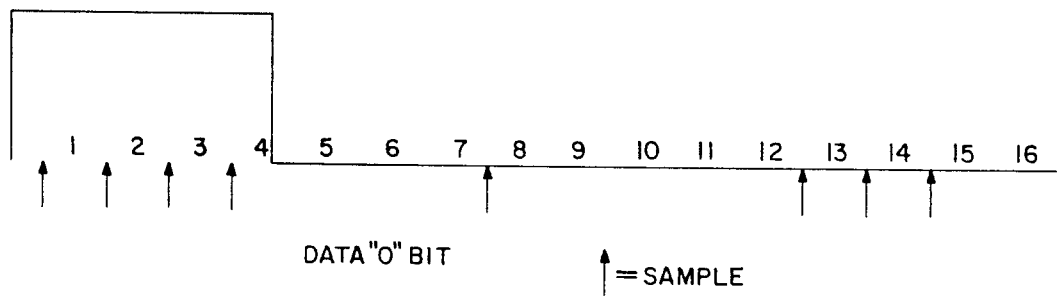
DATA "0" BIT    ↑ = SAMPLE
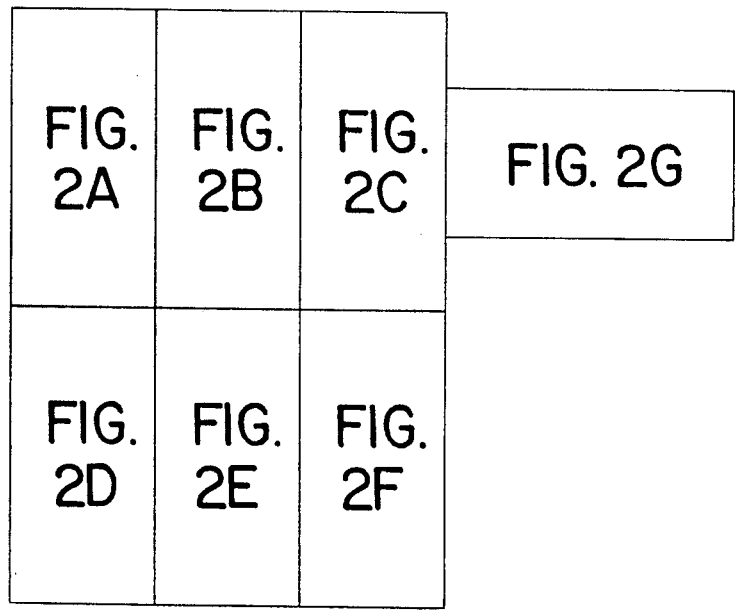
FIG. 2H

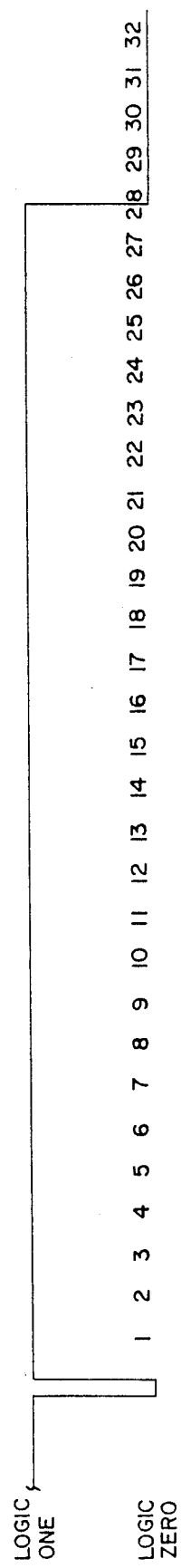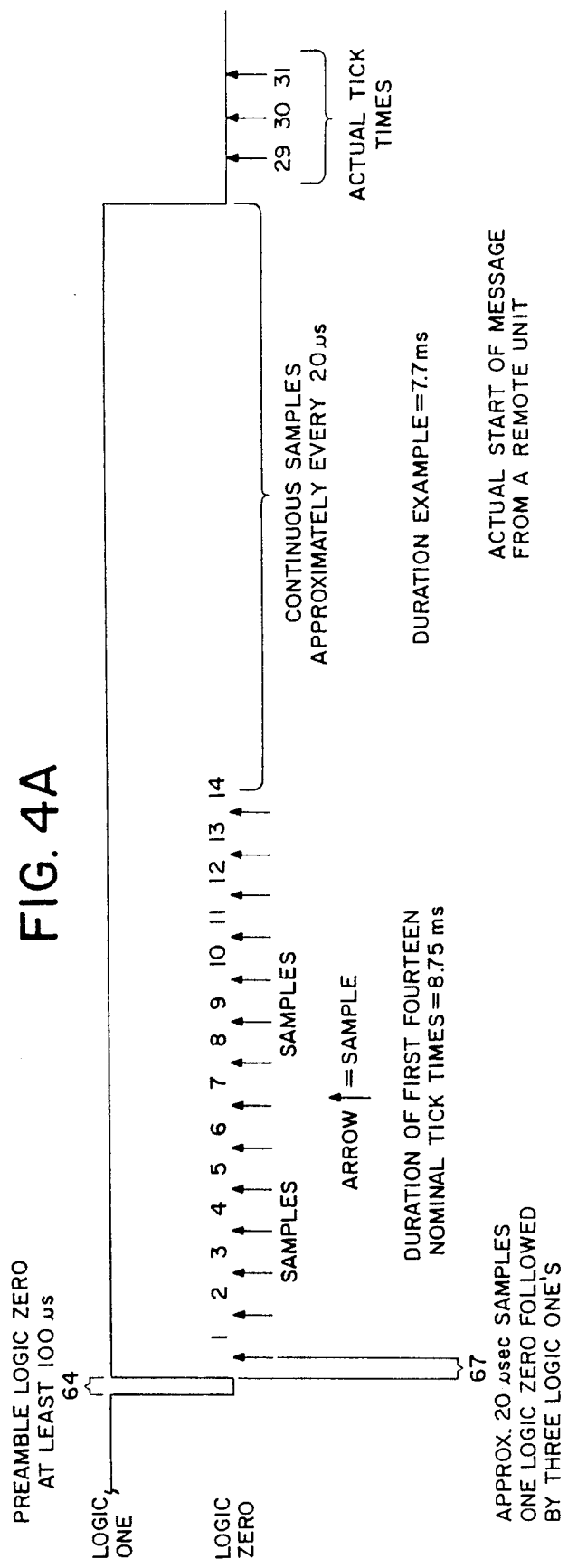

COMMUNICATOR AND COMMUNICATION METHOD AND SYSTEM

TECHNICAL FIELD

The present invention relates to communicating devices for use with a plurality of remote devices having communication capability and specifically for interconnecting with a communication bus for interrogating a plurality of emergency lighting and exit sign type devices as to their operating condition as well as to initiate and observe results of self-testing. The invention also relates to a communication method and system used as part of a communicator (which may be portable) which has the ability to determine a remote device's communication speed and to adapt thereto.

BACKGROUND OF THE INVENTION

The present invention is directed to a communication method and system so as to provide for communication between a host communicator unit and one or more remote units in a noisy communication environment. The host communicator may be portable and interconnects with a plurality of remote units via a communication bus. These remote units may be emergency lighting or exit sign devices with self-testing capability as well as communication capability. Background concerning such emergency lighting units and exit signs having self-testing capability is disclosed in co-pending U.S. Application, Ser. No. 07/048,530, filed May 8, 1987, for an Emergency Lighting Supervisory System, assigned to the present assignee, and hereby incorporated by reference.

One of the problems encountered in a system designed to be interconnected with a plurality of remote units using a bus, wherein a plurality of such units are connected across the bus, is the requirement that communications be reliable and that they operate in environments where such emergency lighting and exit signs are located, typically in commercial and industrial establishments which may have high ambient electrical noise due to electrical motors, fluorescent lighting fixtures and the like.

The present invention addresses this problem by incorporating a data detection method which provides for the automatic adjustment of the receiver associated with the communicator so as to determine the remote unit's actual transmission rate which may vary widely from a nominal transmission rate. It is desirable to reliably detect such remote units since such units are significantly less expensive to manufacture if crystal controlled transmitters are not utilized.

The present invention detects the actual transmission rate from the remote unit by use of a start of message (SOM) header element from the remote unit which thereby allows for the susequent accurate detection of data "1" bits and data "0" bits received from the remote unit. The SOM also denotes the start of the entire message from the transmitting unit.

The present invention then, through its associated electronics, allows the user at the host communicator to interrogate one or more of remote units as to their operating status as well as to initiate self-testing operations.

SUMMARY OF THE INVENTION

A communication method and system for error-free data detection is disclosed, directed particularly for use between a host communicator (which may be portable) and one or more remote units for receipt of information from those remote units in a noisy electrical environment. The communication method employs a data detection method so as to insure a high probability that the data received is error-free and furthermore to receive and properly detect such incoming data for remote units having transmission speeds which may vary widely from a nominal transmission speed.

This data detection method is used in conjunction with a host communicator that can interrogate the remote units concerning their status and to initiate self-tests at these remote units.

The data detection method incorporates three basic data elements, namely: a start of message header, a data "1" bit and a data "0" bit. These elements are defined in terms of the mark/space interval ratio (logic one and logic zero ratio) which in turn have durations expressed in units of time called "ticks". The nominal tick time for incoming data from a remote unit can vary by approximately plus or minus thirty percent and the host communicator can accommodate and accurately detect such a variation in the nominal tick time so as to validly detect a start of message header, data "1" bit and a data "0" bit.

In operation, the first element received from a remote unit is a start of message header and this header is detected in a manner so as to detect the variations in actual tick time from the nominal tick time. This detection analysis is completed prior to the completion of the start of message header so that immediately following data from the remote unit can be accurately detected by the host unit. In this manner, valid data reception is insured over a wide range of remote unit data transmission rates.

Furthermore, the particular sampling techniques used to detect a data "1" bit and a data "0" bit further insures detection even when induced electrical "noise" is present on the communication bus.

OBJECTS OF THE INVENTION

It is therefore a principal object of the present invention to provide a communication method and system having a data detection technique which can accurately determine the incoming data transmission rate from a remote unit over a wide variation about a nominal transmission rate.

A further object of the present invention is to provide a communication method and system as described above wherein the incoming data comprises a start of message header which in turn is related to a plurality of time intervals (tick times) and wherein the variation of the actual tick time from the nominal tick time is determined by sensing a logic one to logic zero transition after receipt of a valid first portion of the start of message header.

A further object of the present invention is to provide a communication method and system as defined above wherein the determination of the actual tick time is used for determining incoming data "1" bits and data "0" bits.

A still further object of the present invention is to provide a communication method and system wherein all data elements are sampled a plurality of times during each data element's overall duration so as to insure error-free data detection.

A still further object of the present invention is a communicator (which may be portable) incorporating the communication method and system as defined above so as to interrogate one or more remote units interconnected to the communicator via a communication bus.

Another object of the present invention is a communication method and system that uses consecutive readings of the bus to determine the presence of a valid logic zero to logic one transition and a logic one to logic zero transition.

A still further object of the present invention is a communication method and system that requires at least a majority of a plurality of consecutive readings to be a logic zero or a logic one for a corresponding valid logic zero or logic one to be determined.

Another object of the present invention is a communication method and system that resets the timer associated with determining a logic "0" bit or a logic "1" bit based upon detecting a logic zero one transition.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIG. 2, comprising FIGS. 2A-2G is an overall schematic diagram of the logic circuitry used in the host communicating device shown in FIG. 1.

FIG. 2H is a diagram showing how FIGS. 2A-2G are put together to form FIG. 2.

FIG. 4 is an electrical waveform showing a nominal start of message header (SOM). FIG. 4A is an electrical waveform of an actual start of message header as well as the sampling of this header by the host communicator so as to determine the variation between the actual tick time interval and the nominal tick time interval.

FIG. 5 is an electrical waveform for a data "1" bit showing the sampling intervals and the tick time intervals comprising this data element.

FIG. 6 is a waveform showing the data "0" bit showing the sampling intervals to detect this data element by the host communicator and the tick time intervals associated with this data element.

BEST MODE FOR CARRYING OUT THE INVENTION

Figure 1:
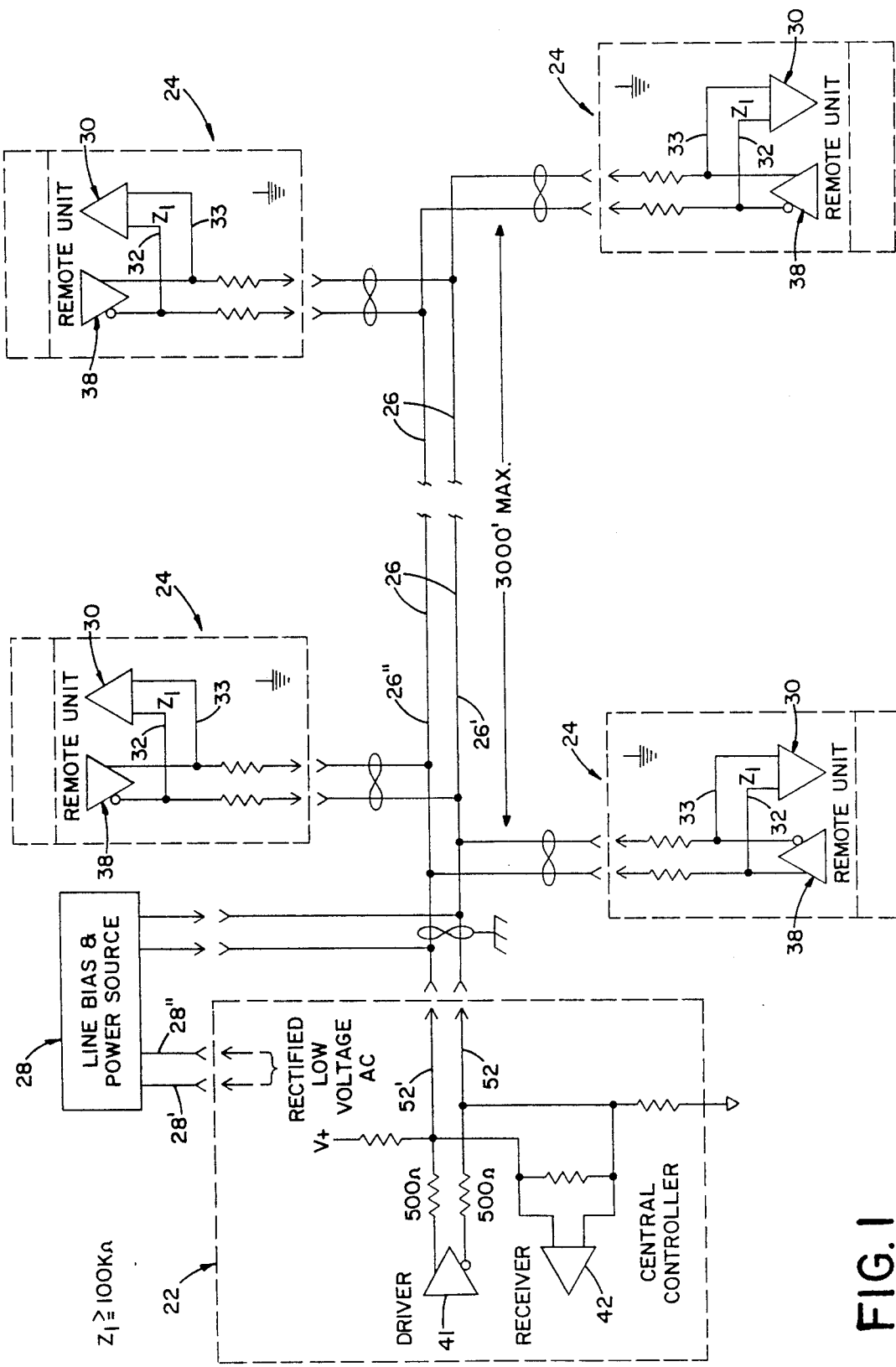
FIG. 1 is a system configuration diagram showing a host communicator and a plurality of remote units interconnected by a communication bus employing the communication method and system of the present invention.
Figure 3:
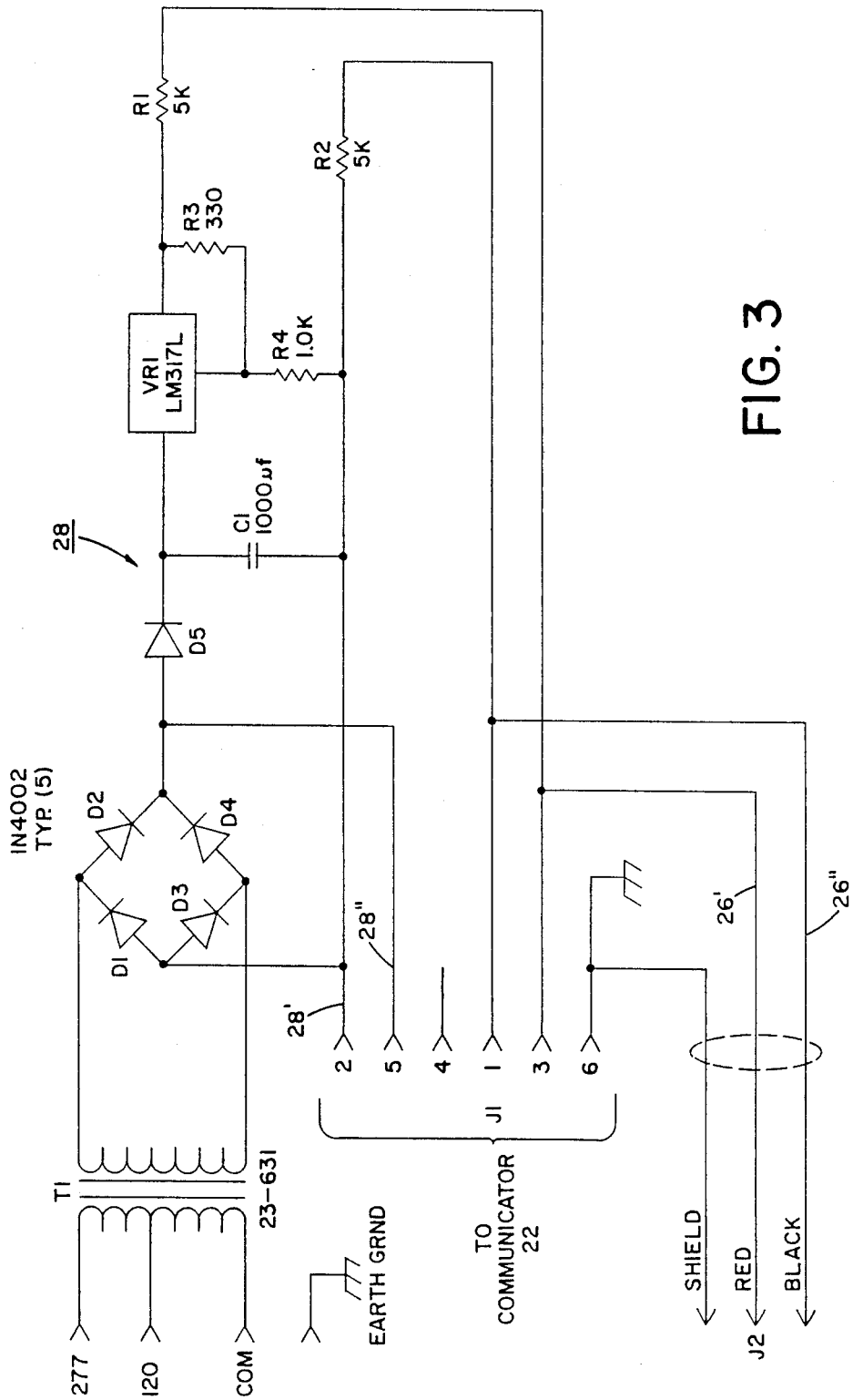
FIG. 3 is a schematic diagram of the line bias and power source devices shown in FIG. 1.

As best seen in FIG. 1, an overall system 20 employing a data communication method and system according to the present invention incorporates a host communicator 22 (which may be portable), one or more remote units 24 which interconnect with the host communicator 22 by means of communication bus 26, and a line bias and power source 28. The communicator bus includes lines 26' and 26" which are maintained in a logic one state by the bias module unless communication information is present. As shown in FIG. 3, this module also can provide power to the host communicator.

In the preferred embodiment of the present invention, the host communicator 22 is a portable device having logic circuitry as set forth in FIG. 2 comprising FIGS. 2A through 2G.

A line bias and power source 28 connects to communication lines 26' and 26" so as to differentially bias these two lines to be in a plus 5 volt configuration line (26' positive with respect to line 26"), thereby representing a logic one state. Outputs 28' and 28" provide rectified low voltage power to communicator 22 for powering the communicator after rectification via a power supply such as that disclosed in applicant's co-pending application Ser. No. 07/145,225, filed Jan. 19, 1988, hereby incorporated by reference.

In operation, each remote unit has a unique address which when sensed by that remote unit, causes that remote unit to respond to commands from host communicator 22. The host communicator can thus determine the present status of the remote unit and can also initiate various test procedures to be conducted by the remote unit with subsequent transfer of the test results to the communicator.

Details concerning the differential receiver circuit used in the remote units are presented in U.S. Pat. No. 4,742,309, issued May 3, 1988, whose disclosure is hereby incorporated by reference.

In operation, a remote unit when it senses its address in a transmitted message, responds with its own message which is received by communicator 22. The transmitted message by communicator 22 is produced by driver 41 with the incoming data received by receiver 42. The receivers 30 associated with each remote unit correspond to the receivers disclosed in corresponding application Ser. No. 06/948,313.

Figure 7:
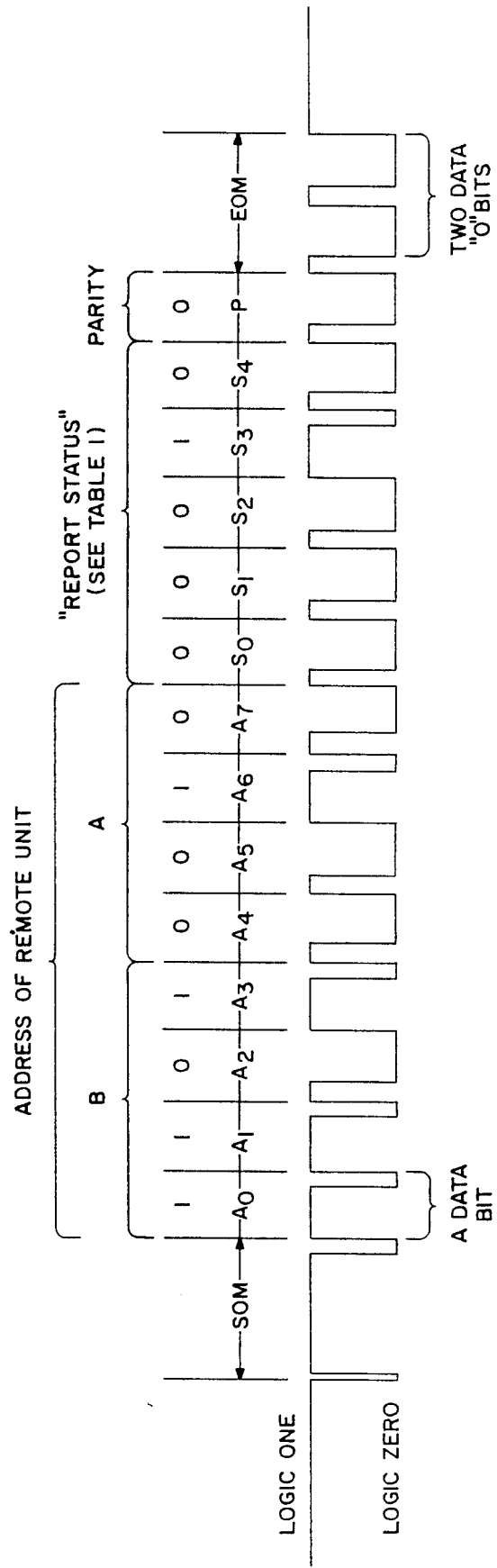
FIG. 7 shows the overall message which may be sent by a remote unit or the host communicator.

As seen in FIG. 7, each transmission message, whether generated by the communicator 22 or by a remote unit 24, comprises the same overall format; namely, a start of message header (SOM) eight address bits ($A_0$ through $A_7$), five status bits ($S_0$ through $S_4$), one parity bit, and two end of message trailer bits (EOM) which must be logic "0" bits.

As seen in FIG. 4, the start of message header has a specific format; namely, a logic zero to logic one transition, followed by 28 tick times in which the logic one state is maintained, followed by four tick times in which the logic zero state is maintained. The format for a data "1" bit comprises a logic one state for twelve tick times and a logic zero state for four tick times as shown in FIG. 5. The format for a data "0" bit comprises a logic one state for four tick times, followed by a logic zero state for twelve tick times.

The nominal tick time is 625 microseconds. The communicator 22 as seen in FIG. 22A incorporates a crystal 50 so that the transmitted output on lines 52 and 52' maintains a precise 625 microsecond tick time length. Thus the nominal start of message header comprises twenty-eight ticks or 17,500 micro-seconds (17.5 milli-seconds) in a logic one state and 2,500 micro-seconds (2.5 ms) in a logic zero state. The logic one state is defined as a plus 5 volt differential signal between lines 26' and 26" (line 26" positive with respect to line 26') while a logic zero state is defined as a minus 5 volt differential signal between lines 26' and line 26".

The data "1" bit as shown in FIG. 5 comprises a logic one state for twelve tick times, that is for 7.5 ms and a logic zero state for four tick times, that is for 2.5 ms.

Conversely, the data "0" bit comprises a logic one for 2.5 ms corresponding to four tick times and a logic zero state for 7.5 ms, corresponding to twelve tick times.

Determination of the Actual Tick Time Associated With a Remote Unit

The remote unit's transmitter 38 is not crystal controlled nor tightly controlled by other means and therefore its nominal tick time can vary by as much as plus or minus thirty percent of the nominal 625 microsecond tick time duration. Because of this wide range in the actual tick time associated with any remote unit, it is necessary that the communicator 22 be able to determine the actual tick time of a transmitting remote unit in order to be able to correctly interpret the subsequent incoming data. Since as shown in FIG. 7 all transmission messages begin with a start of message header, the start of message header not only informs the communicator that a remote unit is transmitting a message, but also provides the necessary information to determine the actual tick time associated with that remote unit.

FIG. 4A is a waveform of a typical SOM header from a remote unit. Just prior to the start of message header, the remote unit transmits a short logic zero for at least 100 microseconds, but typically 1 ms. This is shown in FIG. 4A by reference 64 for the initial logic one to logic zero and logic zero to logic one transitions at the beginning of the SOM waveform. Once the communicator detects a logic zero state on the communication bus, it is enabled to detect a logic zero to logic one transition forming the start of the SOM header logic one state. A logic zero or logic one state is defined as present if at least three out of four consecutive readings of the bus (which occur at intervals of approximately once every 20 microseconds) are in a logic zero or logic one state respectively. A "sample" therefore represents the results of four consecutive readings. This technique adds significant noise immunity to the method. A logic zero to logic one transition at the beginning of a start of message header or at the beginning of a data "0" bit or data "1" bit requires four consecutive readings to be as follows: logic zero, logic one, logic one, and logic one. The logic one to logic zero transition of a start of message header requires four consecutive readings to be as follows: logic one, logic zero, logic zero, and logic zero. This technique insures an accurate determination of the entire duration of the logic one state of the start of message header.

Thus after transmitting its initial message to the remote unit, the communicator waits approximately 20 ms to begin its search for this 1 ms preamble condition associated with the beginning of a start of message header. This is performed by the communicator taking continuous consecutive readings of the communication bus until a logic zero is found, followed by three logic one's which denotes the logic zero to logic one transition at the beginning of a start of message header (see reference area 67). The consecutive reading rate of the communicator is approximately once every 20 microseconds and thus the logic zero to logic one transition is nominally detected as an actual transition by the communicator within approximately 80 microseconds.

If such a logic zero to logic one transition is not detected within a window of 30 ms after the communicator starts sampling the line (that is after the 20 ms wait following the communicator's initial transmission to the remote unit), the communicator stops its search for a logic zero to logic one transition and treats this condition as a "no reply" condition. These conditions are discussed more fully below.

After finding a logic zero to logic one transition marking the beginning of a start of message header, the communicator takes samples of the input for the first fourteen nominal tick periods. All of these smaples (each comprising four consecutive readings as discussed above) must result in logic one state for a valid start of message header to considered present. In this situation, the communicator waits until the end of the fourteenth nominal tick time (that is for 8.75 ms) at which time the communicator takes continuous consecutive readings of the bus (lines 26' and 26" as defined above) so as to detect a logic one to logic zero transition indicating the end of the actual 28th tick of the incoming start of message header. Since the amount of time from the fourteen nominal tick time until a logic one to logic zero transition is accumulated by the communicator, this length of time is used in combination with the fourteen nominal tick times to determine the actual length of time which the start of message header was in the logic one state.

This length of time is equal to fourteen times 625 microseconds (the first fourteen nominal ticks) plus the length of time after the fourteenth nominal tick time in which a logic one state was sensed by the communicator (see FIG. 4A). This time can be calculated by the following equation.

$$\text{Incoming Actual Tick Time} = (8.75 \text{ ms} + (\text{elasped time after fourteenth nominal tick time}))/28$$

In the example shown in FIG. 4A, the logic one to logic zero transition occurred between the twenty-sixth and twenty-seventh nominal tick time indicating that the actual tick time for the remote unit sending the SOM header was shorter than 625 microseconds per tick time. For instance, if this measured time equals 7.7 ms, then according to the above equation, the actual tick time equals 8.75 ms plus 7.7 ms divided by 28, or 0.5875 ms (587.5 microseconds).

Once this calculation is determined by the communicator, it sets its tick timer to the actual tick time of the remote unit so that all subsequent references to tick times for determining a data "1" or a data "0" bit is sampled using this actual tick time.

In addition, in order to complete the test for a valid start of message header, it is necessary that the header maintain a logic zero state during at least two other samples of its actual 29th through 32nd tick times. These samples may be made at the 29th, 30th, and 31st actual tick times and if both of these samples indicate a logic zero state, then a valid start of message header is considered found and the actual tick time determined.

Program Execution of Transmission Rate Detection

Figure 2A:
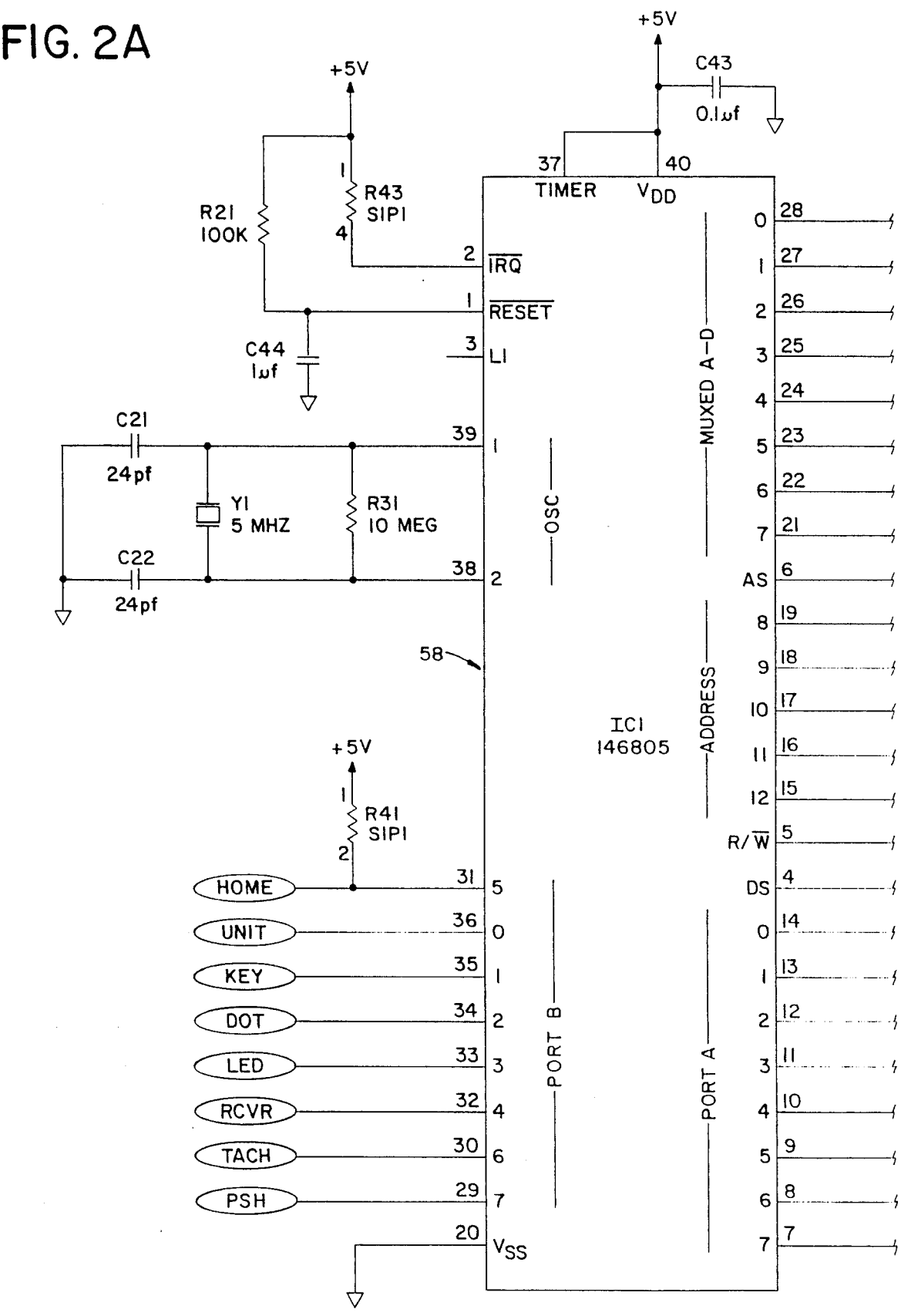
Figure 2B:
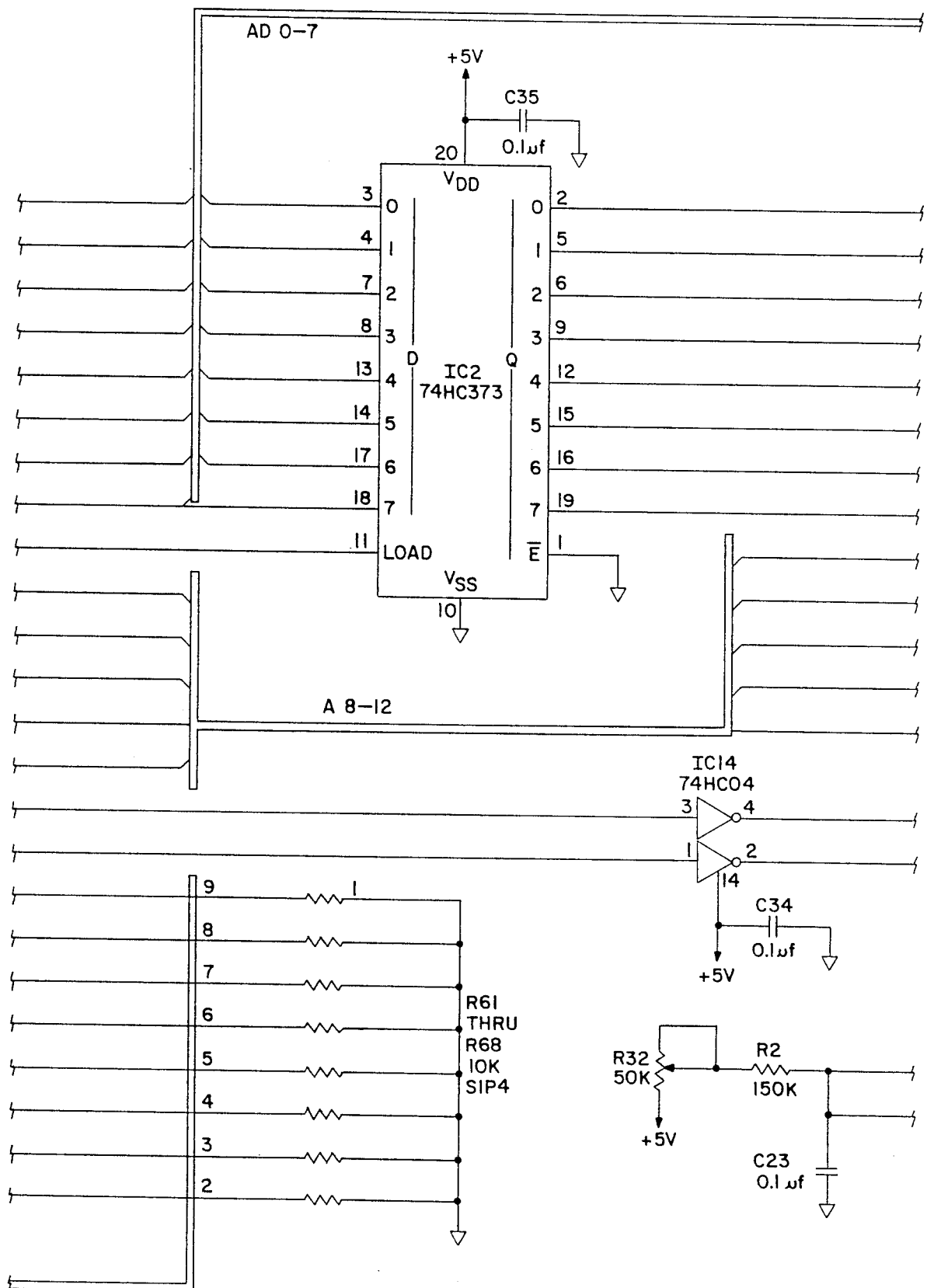
Figure 2D:
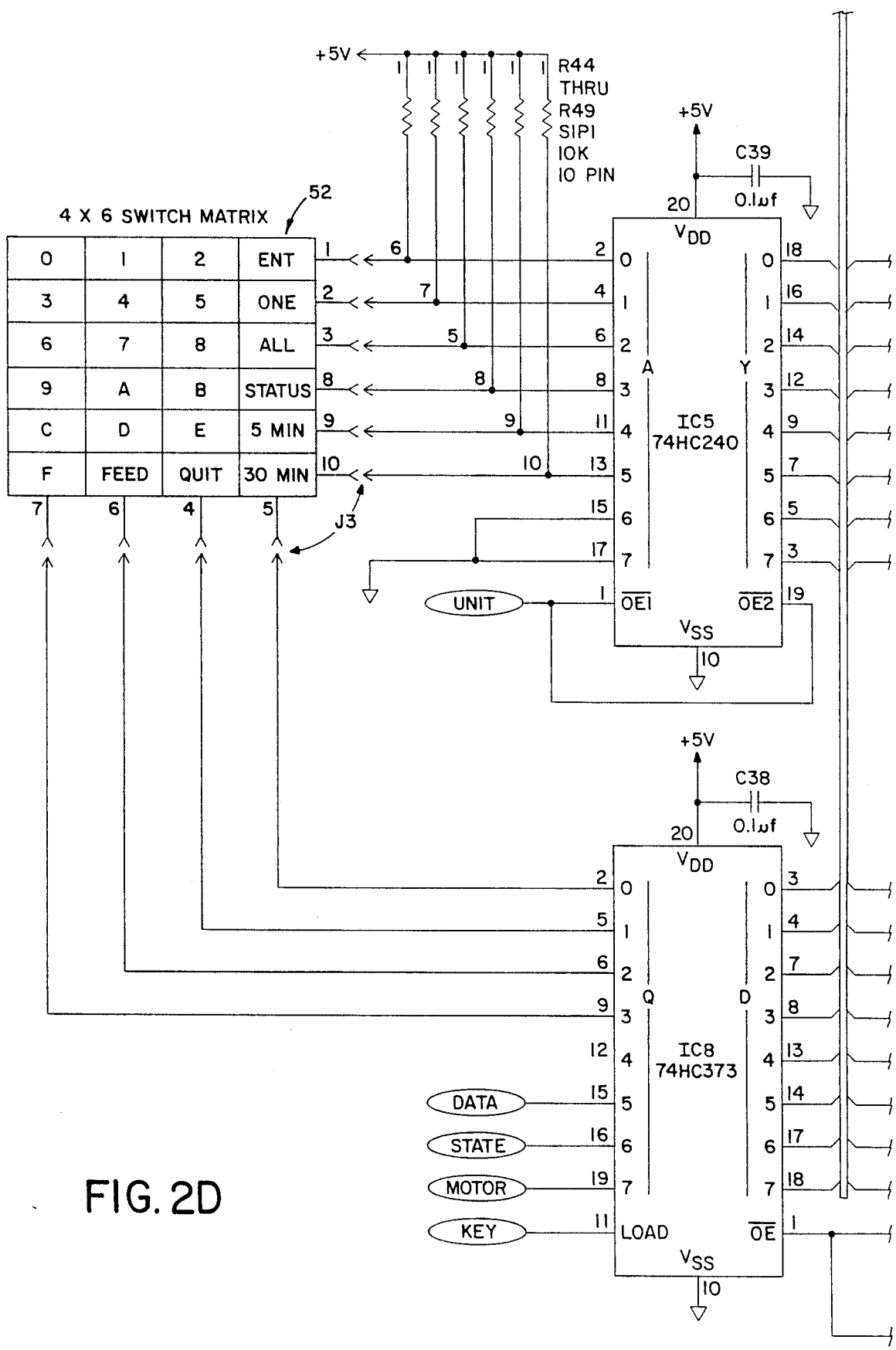

The above determination of the remote unit's actual transmission rate is performed by central processing unit 58 shown in FIG. 2A under program control.

The overall computer program stored in memory 56 (see FIG. 2C) and executed by central processing unit (CPU) 58, a 6805 type CPU, is set forth in Table 2. Table 2 is written in assembly language and the portion regarding receipt of an overall message having a format as shown in FIG. 7 is given from page 3, line 1,000 through line 8490. This portion of the program includes the determination of the actual tick time.

The routine entitled BAUD.START (lines 2710 through 3420) performs the search for a logic zero to logic one transition which must be found to determine the presence of a SOM header, as well as to restart the tick times for determining the presence of a logic "0" bit or a logic "1" bit.

Once a logic zero to logic one transition is found, the SOM routine is invoked (see line 1770) which appears at lines 4840 through 7040. This routine checks to make sure that the first fourteen nominal ticks are logic one's by invoking the SAMPLE routine (lines 4120 through 4820). The SAMPLE routine takes four consecutive readings of the bus and requires that at least three out of the four readings either be in a logic one state or a logic zero state for that state to be considered valid. This routine forms a digital filter which tends to suppress spurious voltages on the bus from being considered valid logic levels. This routine is also used for testing logic levels associated with data "0" bits and data "1" bits.

If logic one's are obtained for the first fourteen nominal ticks, the routine looks for a logic one to logic zero transition and keeps track of the elapsed time while looking for this transition. Due to limitations of the 6805 CPU, a PRESCALE register is used to keep track of some of the elapsed time (see lines 5180 through 5800). The calculation of the actual tick time is presented from lines 5820 through 7040.

To insure a valid SOM header, the main routine at line 1790 calls the MARK.END routine (lines 7210 through 7360) to make sure that logic zero is detected for the two sampled ticks between actual ticks 29 through 32.

The routine for detecting data "0" bits and data "1" bits is entitled DATA.BIT at lines 3440 through 4090. This routine uses the BAUD.START routine to test for a logic zero to logic one transition. If found, it resets the actual tick timer so as to avoid the build-up of cumulative timing errors which otherwise could result due to difference between the calculated actual tick time and that produced by the remote unit, as well as variations which might occur in the remote unit's transmission rate.

The DATA.BIT routine then samples the logic levels at tick times 1, 2, 3 and 4, requiring that each determined logic level be logic one's for a valid data bit (see FIGS. 5 and 6). It then samples the logic level at tick time 8 to determine whether the data bit as a "0" or "1" (see FIGS. 5 and 6). Each sample uses the SAMPLE routine.

The BAUD.END routine is then invoked to insure that the data bit is valid. In this way, high nose immunity is obtained in the detection of each data bit comprising the incoming message shown in FIG. 7.

The parity is incremented and checked at lines 2030 through 2470 while the EOM routine insures a proper end of message (two data "0" bits) at the end of the fourteen bit (baud) message (see FIG. 7 and lines 7510 through 7930).

The remaining portion of Table 2 implements all the other functions of the communicator including interrogating the remote units and causing printer output to associated printer 60 (FIG. 2C) for receipt of the dot outputs from IC 7 (see FIG. 2E) and from IC 9 (see FIG. 2C).

Although the above procedure uses the determination of a tick time, the procedure could equally have measured the logic one state of the SOM over its entire duration without reference to such tick times.

Since each overall transmission comprises a start of message header, eight address bits, five status bits, a parity bit and an end of message header (see FIG. 7), an incoming address bit immediately follows the start of message header from the remote unit. Thus the communicator continues to sample incoming data so as to determine data "0" bits and data "1" bits with a sampling technique for both as shown in FIGS. 5 and 6. As there seen and as explained above, the communicator samples at actual tick times, 1, 2, 3 and 4, followed by a sample at tick times 8, 14, 15 and 16. Since both the data "0" bit and data "1" bit should be in the logic one state for actual tick times 1, 2, 3 and 4, it is required that in order to be considered valid data, the first samples taken at tick times 1, 2, 3 and 4 must always be in the logic one state. Similarly, as shown in FIGS. 5 and 6, both a data bit "1" and a data bit "0" must be in a logic zero state during tick times 13 through 16 and therefore the samples taken at actual tick times 14, 15 and 16 must always be in a logic zero state in order for the data to be considered valid.

It is important to note that the communicator resets the tick time to zero only when it senses a logic zero to logic one transition as discussed above; that is, when four consecutive readings are logic zero, logic one, logic one and logic one. By resetting its tick timer at the start of each logic zero to logic one transition (which transition is present at the start of each data bit), any error in the determined actual tick time is prevented from accumulating during a transmission. It also insures that the sample taken at tick 8 is always going to occur at the mid-region of the data bit. It is this mid-region that denotes the nature of the data bit (whether it is a "0" or "1").

The sample taken at tick time 8 then accurately determines whether the incoming data bit is a data bit "1" or a data bit "0". If the sample taken at the 8th tick time is in a logic one state, then the data bit is a data bit "1", and conversely if the sample is in a logic zero state, the data bit is a data "0" bit.

Since the message obtained by the communicator is with regard to a particular addressed remote unit, the first eight data bits following the start of message header represent the address of the remote unit and must correspond to the address which was sent out by the communicator. If a match is not obtained (that is, if the received address is different from the transmitted address) then the communicator causes a message to be printed on an associated printer 60 (see FIG. 2C), indicating that a wrong remote unit answered the communicator.

If the address does correspond to the transmitted address, the communicator causes a message to be printed on its associated printer indicating the meaning of the next five status bits according to Table 1.

TABLE 1

| Status Bits | | | | | Command/ | |
| --- | --- | --- | --- | --- | --- | --- |
| S0 | S1 | S2 | S3 | S4 | Response | Meaning |
| 0 | 0 | 0 | 1 | 1 | C | start 5 min. self-test |
| 0 | 0 | 0 | 0 | 1 | C | start 30 min. self-test |
| 0 | 0 | 1 | 0 | 0 | R | self-test started |
| 0 | 0 | 0 | 0 | 0 | R | not started |
| 0 | 0 | 0 | 1 | 0 | C | report status |
| 1 | X | X | X | X | R | charger: fail |
| X | X | 1 | 1 | X | R | battery: fail |
| X | X | 1 | 0 | X | R | transfer: fail |
| X | X | 0 | 1 | X | R | lamps: fail |
| X | X | X | X | 1 | R | electrolyte: fail |
| 0 | 1 | 0 | 0 | 0 | R | status is normal |

TABLE 1-continued

| Status Bits | | | | | Command/ | |
|---|---|---|---|---|---|---|
| S0 | S1 | S2 | S3 | S4 | Response | Meaning |
| 0 | 0 | 0 | 0 | 0 | R | status is normal |

X = "Don't care"
C = indicates transmission from the host communicator 22
R = indicates transmission from a remote unit 24

As also seen in Table 1, the communicator can command various actions of the remote unit, including the command to cause the remote unit to report its status, a command for the remote unit to start a five minute self-test, and a command to cause the remote unit to start a thirty minute self-test. These commands as well as the selection of which units to be interrogated is controlled by the user through keypad 52 shown in FIG. 2D. The program implementations of these functions is also presented in Table 2.

SWITCH FUNCTIONS

The switch functions of keypad 52 are as follows:

KEYS O-F: These keys are used to address the remote units to be polled by the communicator for a one unit scan, or the starting address of the first remote unit to be polled if all units have been selected.

FEED: This key advances the paper associated with the interconnected printer to facilitate paper loading and also leaves a margin at the end of a report.

QUIT: This key stops the scanning process if all units have been selected. If pressed prior to the start of a scan, it will return to the status/test selection mode.

30 MIN: This command causes the remote unit to initiate a thirty minute self-discharge test.

5 MIN: This command causes the remote unit to initiate a five minute self-discharge test.

STATUS: This command causes the remote unit to report its status.

ALL: This key selects all units for either a status report or a self-test initiation.

ONE: This key selects only one unit for a status report or a self-test initiation.

ENTER: This key causes the communicator to accept the last two entries on keys O-F as the starting address for an ALL units scan or the address of a single unit on a ONE unit scan. When this key is pressed a second time, it causes the communicator to enter into its transmit mode. Upon power up, the host communicator defaults to an ALL units STATUS scan. This scan is initiated by pressing the ENTER switch four times.

Figure 2E:
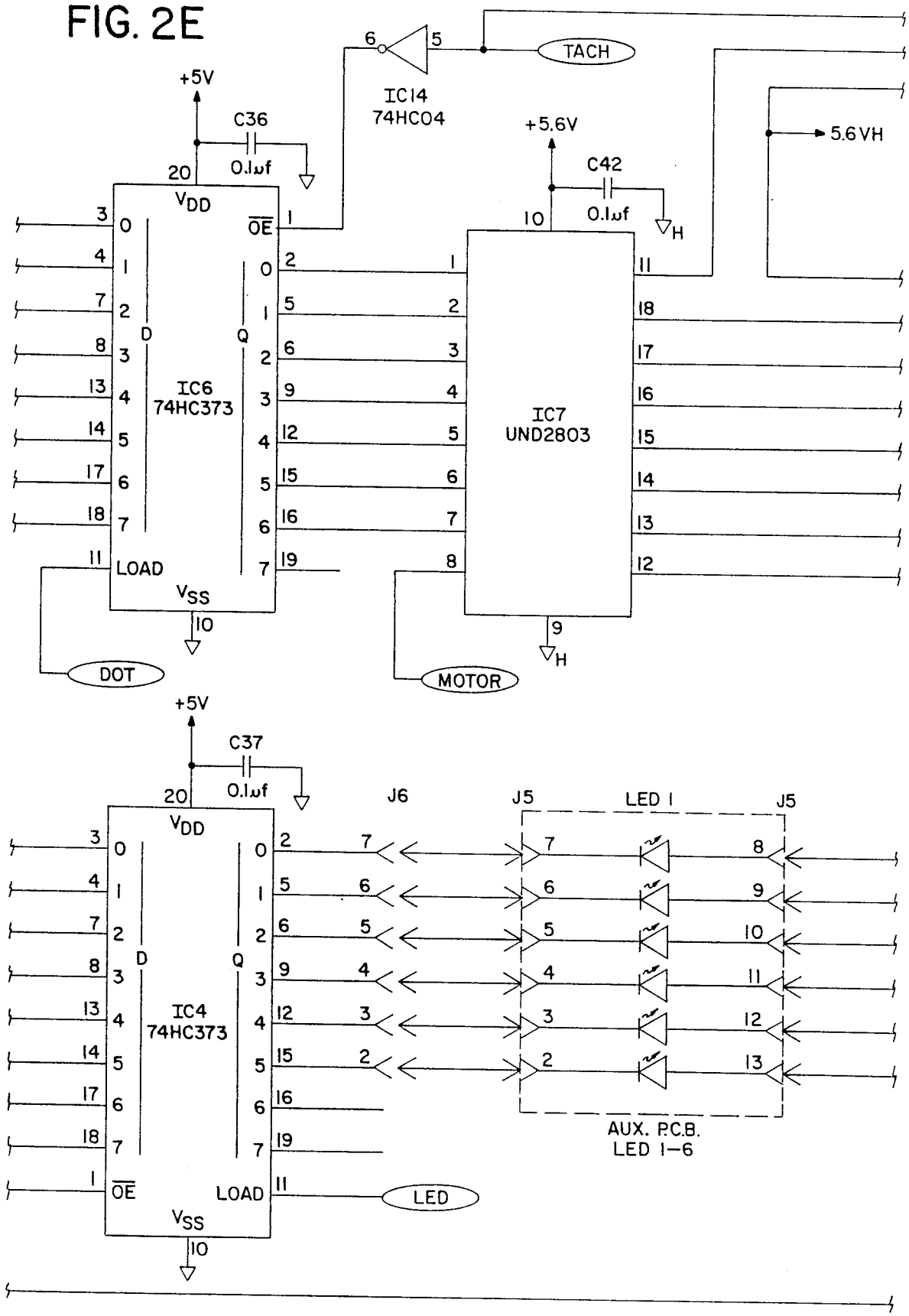

INDICATORS: Light emitting diodes are located under the ENTER, ONE, ALL, STATUS, 5 MIN and the 30 MIN keys. These light emitting diodes 54 are shown in FIG. 2E and illuminate and blink at various times under control of the controlled program set forth in Table 2. The blinking guides the user in the operation of the communicator.

The examples numbered one through seven in Table 3 indicate the various tests and results obtained using the communicator according to the present invention.

OPERATION MODES

The operation modes to obtain the various reports shown in Table 3 allow the communicator to cause remote emergency lighting units to do one of three things: namely, to report their status, to start a five minute self-discharge test, or to start a thirty minute self-discharge test.

TABLE 3

EXAMPLE #1
5 MINUTE TEST

SCAN ALL UNITS STARTING AT

UNIT:00

UNIT:00
TEST STARTED

UNIT 02:
TEST STARTED
UNIT:04
TEST STARTED

UNIT:06
TEST STARTED

UNIT:08
TEST STARTED

UNIT:9F
TEST STARTED

UNIT:20
TEST STARTED

UNIT:33
TEST STARTED

UNIT:3F
TEST STARTED

UNIT:FF
TEST STARTED

ENDING AT
UNIT:FF

DATE _____
ACCEPTED BY:

EXAMPLE #2
30 MINUTE TEST

SCAN ONE UNIT

UNIT:FF

TEST STARTED

DATE _____
ACCEPTED BY:

EXAMPLE #3
5 MINUTE TEST

SCAN ONE UNIT

UNIT:4C

NO REPLY

DATE _____
ACCEPTED BY:

EXAMPLE #4
30 MINUTE TEST

SCAN ONE UNIT

UNIT:A2

NOT STARTED

TABLE 3-continued

DATE _____
ACCEPTED BY: _____

EXAMPLE #5
STATUS REPORT

SCAN ALL UNITS
STARTING AT

UNIT:00

UNIT:00
STATUS IS NORMAL

UNIT:02
STATUS IS NORMAL

UNIT:04
STATUS IS NORMAL

UNIT:06
STATUS IS NORMAL

UNIT:08
STATUS IS NORMAL
UNIT:0F
STATUS IS NORMAL

UNIT:20
STATUS IS NORMAL

UNIT:33
=CURRENT STATUS=
  CHANGES: PASS
=PER LAST TEST=
  BATTERY: PASS
  TRANSFER: PASS
  LAMPS: FAIL

UNIT:3F
STATUS IS NORMAL

UNIT:FF
STATUS IS NORMAL

ENDING AT
UNIT:FF

DATE _____
ACCEPTED BY: _____

EXAMPLE #6
STATUS REPORT

SCAN ONE UNIT

UNIT:3F

STATUS IS NORMAL

DATE _____
ACCEPTED BY: _____

EXAMPLE #7
STATUS REPORT

SCAN ONE UNIT

UNIT:5E

NO REPLY

DATE _____
ACCEPTED BY: _____

TABLE 3-continued

STATUS REPORT

Selecting the STATUS key on keypad 52 causes the communicator to enter into the status report mode. In this mode, a command is issued which causes the remote unit to report its status. Status indicates the current status of the unit including its charge state and electrolyte level for remote emergency lighting units such as those disclosed in application, Ser. No. 07/048,530, filed May 8, 1987. It also causes results of the last-self discharge test to be transmitted, including the battery condition, the transfer circuitry condition and the lamp condition. If there are no failures, a "status is normal" message is printed on the associated printer. If there are any failures, then a complete status report is printed.

ONE UNIT SCAN

After the user enters the address of the unit to be polled by pressing the ENTER key, the communicator initiates the scan of that unit. After receiving the reply from the remote unit, the communicator prints either "status is normal" or a failure report. Formats given in examples 5 and 6 of Table 3 are representative of these reports. If the unit does not answer, such as due to a communication failure or that no unit is at the selected address, then a "no reply" message is printed along with the unit address. This type of result is shown in example 7 of Table 3.

ALL UNITS SCAN

This type of scan is started after entering the address of the first unit to be polled and pressing the ENTER key again. After receiving the reply, the communicator prints the report and the unit addresses and then polls the next consecutive address until all addresses have been polled or until the QUIT key is pressed. During such an ALL units scan, the ALL LED flashes to inform the operator that the communicator is in such a mode.

TEST MODE

The test mode initiates either a five minute or thirty minute self-discharge test. This mode only initiates the self-test. To obtain the results of the tests, a STATUS report must be requested after completion of the test.

ONE UNIT SCAN

After entering the address of the remote unit to be tested, the ENTER key is pressed a second time to initiate the self-test command. Three possible responses may be printed in response to a ONE unit self-test scan: namely, no reply, self-test started, or not started. (See examples 1, 2, 3 and 4 of Table 3). A NO REPLY and the unit address is printed if the remote unit does not respond or there is no active unit at that address. If the remote unit does not start the self-discharge test, then "NOT STARTED" along with the unit address is printed. The messge TEST STARTED is printed along with the unit address when the remote unit enters a self-test.

ALL UNITS SCAN

After entering the address of the first remote unit to be polled and pressing the ENTER key a second time, the communicator begins to poll each consecutive address starting with the one entered, until all addresses have been polled or the QUIT key is depressed. If the remote unit does not answer or there is no active unit at that address, nothing is printed. As each remote unit answers, the message SELF-TEST along with the unit address is printed.

Thus, what has been described is a communication method and system which can accommodate a wide range of transmission speeds of a plurality of remote units by determining the transmission speed through sampling of a start of message header so as to determine the actual tick time of the remote unit during receipt of its start of message header. In addition, the present invention incorporates a communicator which can initiate a number of tests to one or more interconnected remote units, specifically with regard to such remote units operating as part of an emergency lighting system.

It will thus be seen that the object set forth above, and those made apparent from the preceding description, are efficiently attained and, since certain changes may be made in carrying out the above method as well as the described system, without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be set to fall therebetween.

```
1000
1010 ******************************
1020 *                              *
1030 *      SYSTEM EQUATES          *
1040 *                              *
1050 *      AS OF 1 MAY 1985        *
1060 *                              *
1070 ******************************
1080
1090 *------------------------------
1100 *      CPU REGISTERS
1110 *------------------------------
1120 *      I/O EQUATES
1130 *------------------------------
1140 DDR.A          .EQ $04
1150 DDR.B          .EQ $05
1160 PORT.A         .EQ $00
1170 PORT.B         .EQ $01
1180 WRITE.A        .EQ $FF
1190 READ.A         .EQ $00
1200 SET.UP.B       .EQ $0F
1210 *------------------------------
1220 *      TIMER CONTROL
1230 *------------------------------
1240 TDR            .EQ $08
1250 TCR            .EQ $09
1260
1270 *------------------------------
1280 *      CPU RAM EQUATES
1290 *------------------------------
1300
1310 A.SAVE         .EQ $10
1320 B.SAVE         .EQ $11
1330 X.SAVE         .EQ $12
1340 UNIT.NUMBER    .EQ $13
1350 ADDRESS        .EQ $14
1360 MESSAGE        .EQ $15
1370 REPLY          .EQ $16
1380 SCAN.LENGTH    .EQ $17
1390 STATE.FLAG     .EQ $18
1400 BIT.COUNTER    .EQ $19
1410 PARITY         .EQ $1A
1420 TIMER.COUNT    .EQ $1B
1430 COMMAND        .EQ $1C
1440 PRESCALE.COUNT .EQ $1D
1450 LAST.UNIT      .EQ $1E
1460 LED.MEMORY     .EQ $1F
1470 DATA.MEMORY    .EQ $20
1480 PAPER.FLAG     .EQ $21
1490 PRINT.BUFFER   .EQ $22
1500 *------------------------------
1510 *      MESSAGES
1520 *------------------------------
1530 XMIT.5.MIN.TEST    .EQ $18
1540 XMIT.30.MIN.TEST   .EQ $10
1550 XMIT.STATUS        .EQ $08
1560 *------------------------------
1570 *      LED EQUATES
1580 *------------------------------
1590 LED.ENTER      .EQ $DF
1600 LED.ONE        .EQ $EF
1610 LED.ALL        .EQ $F7
1620 LED.STATUS     .EQ $FB
1630 LED.5.MIN      .EQ $FD
1640 LED.30.MIN     .EQ $FE
1650 LED.OFF        .EQ $FF
1660 *------------------------------
1670 *      XMISSION
1680 *------------------------------
1690 SEND.ONE       .EQ $0F
1700 SEND.ZERO      .EQ $2F
1710 READ.DATA      .EQ $6F
1720 SHORT.LINE     .EQ $7F
1730 *------------------------------
1740 *      PRINTER MOTOR
1750 *------------------------------
1760 MOTOR.ON       .EQ $EF
1770 *------------------------------
1780 *      STROBES
1790 *------------------------------
1800 SWITCH.STROBE  .EQ $00
1810 DATA.STROBE    .EQ $03
1820 DOT.STROBE     .EQ $05
1830 LED.STROBE     .EQ $09
1840 CLEAR.STROBE   .EQ $01
1850 *------------------------------
1860 *      TIMER CONFIGURATIONS
1870 *------------------------------
1880 UNITY.PRESCALE     .EQ $48
1890 ONE.TWENTY.EIGHT   .EQ $4F
1900 *------------------------------
```

```
1000 *SAVE PORTA F
1010 *-------------------------------
1020
1030 ************************************
1040 *      PORTA POLLER PROM F         *
1050 *         VERSION 3.8              *
1060 *      AS OF 19 AUGUST 1985        *
1070 ************************************
1080
1090 ************************************
1100 *    DETECTS INCOMMING DATA        *
1110 *      AND CONVERTS TO A 13        *
1120 *      BIT MESSAGE                 *
1130 *    SETS SAMPLE CLOCK TO          *
1140 *      ACTUAL BAUD RATE            *
1150 *    DATA IS SAMPLED AT BAUD       *
1160 *      MIDPOINT, MEASURED          *
1170 *      FROM 0->1 START             *
1180 *    3 OUT OF 4 SAMPLES MUST       *
1190 *      BE THE SAME FOR VALID       *
1200 *      DATA                        *
1210 *    REPLY IS NEGATIVE ON          *
1220 *      ERROR:                      *
1230 *      LEFT NIBBLE CONTENTS        *
1240 *        $8X = START OF MESSAGE    *
1250 *        $9X = DATA PORTION        *
1260 *        $AX = END OF MESSAGE      *
1270 *        $BX = MESSAGE CHECK       *
1280 *      RIGHT NIBBLE CONTENTS       *
1290 *        $X0 = NO LEADING 0        *
1300 *        $X1 = NOT ALL 1'S         *
1310 *        $X2 = NOT ALL 0'S         *
1320 *        $X5 = NO 0->1 FOUND       *
1330 *        $X6 = NO 1->0 FOUND       *
1340 *        $X8 = INVALID DATA        *
1350 *        $X9 = INVALID DATA 1      *
1360 *        $XA = INVALID DATA 0      *
1370 *        $XC = PARITY              *
1380 *        $XD = ADDRESS             *
1390 ************************************
1400
1410 RECEIVE
1420 *-------------------------------
1430 *      MAKE UP FOR SHORTER
1440 *        (25 USEC) TICK TIME
1450 *-------------------------------
1460         LDA #90
1470         STA TIMER.COUNT
1480 *-------------------------------
1490 *      20 MSEC DELAY
1500 *-------------------------------
1510         LDA #32
1520         STA X.SAVE
1530         JSR TICK.DELAY
1540         CLRA
1550         STA PARITY
1560         STA REPLY
1570         STA ADDRESS
1580 *-------------------------------
1590 *      YOU'VE GOT 30 MSEC TO FIND
1600 *      A 0 => 1 TRANSITION
1610 *      (256 X 128 USEC PRESCALE)
1620 *-------------------------------
1630         LDA #$FF
1640         STA B.SAVE
1650         JSR BAUD.START
1660         BCC .3
1670 *-------------------------------
1680 *      START OF MESSAGE ERROR
1690 *-------------------------------
1700 .1      ORA #$80
1710 .2      STA REPLY
1720         RTS
1730 *-------------------------------
1740 *      FOUND IT -
1750 *        MEASURE TICK TIME
1760 *-------------------------------
1770 .3      JSR SOM
1780         BCS .1
1790         JSR MARK.END
1800         BCS .1
1810 *-------------------------------
1820 *      SET MESSAGE LENGTH -
1830 *        8 ADDRESS + 5 STATUS +
1840 *        1 PARITY + 14 BAUD
1850 *-------------------------------
1860         LDA #14
1870         STA BIT.COUNTER
1880 .4      JSR DATA.BIT
1890         BCC .6
1900 *-------------------------------
1910 *      DATA ERROR
1920 *-------------------------------
1930 .5      ORA #$90
1940         BRA .2
1950 *-------------------------------
1960 *      DATA => CARRY
1970 *-------------------------------
1980 .6      ROLA
1990         BCC .7
2000 *-------------------------------
2010 *      FIX PARITY IF BIT = ONE
2020 *-------------------------------
2030         INC PARITY
2040 *-------------------------------
2050 *      C => REPLY => ADDRESS
2060 *-------------------------------
2070 .7      ROR REPLY
2080         ROR ADDRESS
2090 *-------------------------------
2100 *      DELAY TILL TICK 13
2110 *      LOOK FOR BAUD END
2120 *-------------------------------
2130         LDA #4
2140         STA X.SAVE
2150         JSR CONTINUE.DELAY
2160         JSR BAUD.END
2170         BCS .5
2180 .8      DEC BIT.COUNTER
2190         BNE .4
2200 *-------------------------------
2210 *      LOOK FOR EOM
2220 *-------------------------------
2230         JSR EOM
2240         BCC .10
2250 *-------------------------------
2260 *      EOM ERROR
2270 *-------------------------------
2280         ORA #$A0
2290         STA REPLY
2300         RTS
2310 *-------------------------------
2320 *      STUFF 2 0'S TO FILL BYTE
2330 *-------------------------------
2340 .10     LDA #$02
2350         STA B.SAVE
2360 .11     ROR REPLY
2370         ROR ADDRESS
2380         DEC B.SAVE
2390         BNE .11
2400 *-------------------------------
2410 *      CHECK FOR ODD PARITY
2420 *        NUMBER OF 1'S IN REPLY
2430 *        (INCLUDIONG PARITY)
```

```
2440 *          MUST BE AN ODD NUMBER
2450 *--------------------------------
2460            ROR PARITY
2470            BCS .13
2480 *--------------------------------
2490 *          PARITY ERROR
2500 *--------------------------------
2510            CLRA
2520 .12        ORA #$BC
2530            STA REPLY
2540            RTS
2550 *--------------------------------
2560 *          CHECK ADDRESS SEND BACK
2570 *          AGAINST ONE SENT OUT
2580 *--------------------------------
2590 .13        LDA ADDRESS
2600 *--------------------------------
2610 *          FIX FOR WRONG DIP SW
2620 *--------------------------------
2630            COMA
2640 *--------------------------------
2650            CMP UNIT.NUMBER
2660            BEQ .14
2670            LDA #$01
2680            BRA .12
2690 .14        RTS
2700
2710 ***********************************
2720 *          LOOKS FOR A LEADING 0 -  *
2730 *          THEN THREE 1'S IN A     *
2740 *          ROW TO INDICATE START   *
2750 *          OF A BAUD               *
2760 *          HAVE "B SAVE" X 125 USEC*
2770 *          TO FIND THE START       *
2780 *          IF FOUND:               *
2790 *            RESTART TICK TIMER    *
2800 *            CLEAR CARRY           *
2810 *          IF NOT:                 *
2820 *            $00 = NO LEADING 0    *
2830 *            $05 = NO 0->1         *
2840 *            $08 = INVALID DATA    *
2850 *          125 USEC PROCESSING TIME*
2860 *          AFTER 0=>1 TARNSITION   *
2870 ***********************************
2880
2890 BAUD.START
2900            LDA #3
2910            STA X.SAVE
2920 *--------------------------------
2930 *          SET THE TIMER
2940 *--------------------------------
2950            LDA #ONE.TWENTY.EIGHT
2960            STA TCR
2970            LDA B.SAVE
2980            STA TDR
2990 *--------------------------------
3000 *          LOOK FOR A ZERO
3010 *--------------------------------
3020 .1         BRCLR 4,PORT.B,.2
3030            BRCLR 7,TCR,.1
3040 *--------------------------------
3050 *          NO LEADING ZERO FOUND
3060 *          ACCUM = $00
3070 *--------------------------------
3080            CLRA
3090            BRA .5
3100 *--------------------------------
3110 *          LOOK FOR A ONE
3120 *--------------------------------
3130 .2         BRCLR 4,PORT.B,.3
3140 *--------------------------------
3150 *          FOUND A ONE - COUNT IT
3160 *--------------------------------
3170            DEC X.SAVE
3180            BNE .4
3190 *--------------------------------
3200 *          FOUND 3 ONES IN A ROW
3210 *          RESET TICK TIMER
3220 *--------------------------------
3230            LDA #ONE.TWENTY.EIGHT
3240            STA TCR
3250            LDA PRESCALE.COUNT
3260            STA TDR
3270            CLC
3280            RTS
3290 *--------------------------------
3300 *          FOUND A ZERO - RESET THE
3310 *          ONES COUNTER
3320 *--------------------------------
3330 .3         LDA #$03
3340            STA X.SAVE
3350 .4         BRCLR 7,TCR,.2
3360 *--------------------------------
3370 *          NO 0->1 FOUND
3380 *          ACCUM = $05
3390 *--------------------------------
3400            LDA #$05
3410 .5         SEC
3420            RTS
3430
3440 ***********************************
3450 *          LOOKS FOR A 0->1 FOR    *
3460 *          16 * 128 = 2048 USEC    *
3470 *          IF FOUND:               *
3480 *          (1) RESETS TICK CLOCK   *
3490 *          (2) SAMPLES TICKS 1     *
3500 *              THRU 4 FOR 1'S      *
3510 *          (3) SAMPLES TICK 8 FOR  *
3520 *              VALUE OF DATA       *
3530 ***********************************
3540
3550 DATA.BIT
3560            LDA #16
3570            STA B.SAVE
3580 *--------------------------------
3590 *          LOOK FOR 0->1 TRANSITION
3600 *--------------------------------
3610            JSR BAUD.START
3620            BCC .3
3630 *--------------------------------
3640 *          NO START
3650 *--------------------------------
3660            BEQ .2
3670 .1         ORA #$01
3680            SEC
3690 .2         RTS
3700 *--------------------------------
3710 *          SAMPLE TICK 1
3720 *--------------------------------
3730 .3         JSR SAMPLE
3740            BCS .1
3750            BMI .5
3760 *--------------------------------
3770 *          NOT ALL 1'S
3780 *--------------------------------
3790 .4         CLRA
3800            BRA .1
3810 *--------------------------------
3820 *          SAMPLE TICK 2
3830 *--------------------------------
```

```
3840  .5      JSR FINISH.TICK
3850          JSR SAMPLE
3860          BCS .1
3870          BPL .4
3880  *-----------------------------------
3890  *       SAMPLE TICK 3
3900  *-----------------------------------
3910          JSR FINISH.TICK
3920          JSR SAMPLE
3930          BCS .1
3940          BPL .4
3950  *-----------------------------------
3960  *       SAMPLE TICK 4
3970  *-----------------------------------
3980          JSR FINISH.TICK
3990          JSR SAMPLE
4000          BCS .1
4010          BPL .4
4020  *-----------------------------------
4030  *       SAMPLE TICK 8 (DATA)
4040  *-----------------------------------
4050          LDA #5
4060          STA X.SAVE
4070          JSR CONTINUE.DELAY
4080          JSR SAMPLE
4090          RTS
4100
4110
4120  ***********************************
4130  *    3 OUT OF 4 SAMPLES MUST      *
4140  *    BE THE SAME FOR DATA         *
4150  *    TO BE VALID                  *
4160  *    ON RETURN ACCUM EQUALS:      *
4170  *    $80 FOR DATA = 1             *
4180  *    $00 FOR DATA = 0             *
4190  *    $08 FOR INVALID DATA         *
4200  *    ROUTINE TAKES 130 USEC       *
4210  ***********************************
4220
4230  SAMPLE
4240  *-----------------------------------
4250  *    DIAGNOSTIC - PULSES "DOT"
4260  *    LINE FOR 20 USEC IF
4270  *    TEST 1 = $01
4280  *-----------------------------------
4290          .DO TEST.1
4300          JSR SHOW.SAMPLE
4310          .FIN
4320  *-----------------------------------
4330          CLR X.SAVE
4340          LDA #4
4350          STA A.SAVE
4360  *-----------------------------------
4370  *       TAKE A SAMPLE
4380  *-----------------------------------
4390  .3      BRSET 4,PORT.B,.4
4400  *-----------------------------------
4410  *       ITS A ZERO -
4420  *       DECREMENT THE COUNTER
4430  *-----------------------------------
4440          DEC X.SAVE
4450          BRA .5
4460  *-----------------------------------
4470  *       ITS A ONE -
4480  *       INCREMENT THE COUNTER
4490  *-----------------------------------
4500  .4      INC X.SAVE
4510  *-----------------------------------
4520  *       KEEP TACK OF THE SAMPLES
4530  *-----------------------------------
4540  .5      DEC A.SAVE
4550          BNE .3
4560  *-----------------------------------
4570  *    IF COUNTER = $03 OR $04
4580  *       DATA IS A ONE
4590  *-----------------------------------
4600          LDA X.SAVE
4610          CMP #3
4620          BLO .7
4630          CMP #4
4640          BHI .6
4650          LDA #$80
4660          CLC
4670          RTS
4680  *-----------------------------------
4690  *    IF COUNTER = $FC OR $FD
4700  *       DATA IS A ZERO
4710  *-----------------------------------
4720  .6      CMP #$FD
4730          BHI .7
4740          LDA #$00
4750          CLC
4760          RTS
4770  *-----------------------------------
4780  *       ITS A BUMMER
4790  *-----------------------------------
4800  .7      SEC
4810          LDA #$08
4820  .8      RTS
4830
4840  ***********************************
4850  *    SAMPLES FIRST 14 TICKS,      *
4860  *    WHICH ALL MUST BE 1'S        *
4870  *    THEN MEASURES THE TIME       *
4880  *    FROM THE 14TH TICK TO        *
4890  *    THE 1->0 CHANGE (28TH        *
4900  *    TICK) AND CALCULATES         *
4910  *    THE ACTUAL TICK PERIOD       *
4920  ***********************************
4930
4940  SOM
4950          LDA #14
4960          STA B.SAVE
4970  *-----------------------------------
4980  *       TAKE 14 SAMPLES
4990  *-----------------------------------
5000          JSR SAMPLE
5010          BCS .2
5020          BMI .1
5030          CLRA
5040          BRA .2
5050  .1      DEC B.SAVE
5060          BEQ .3
5070          JSR FINISH.TICK
5080          JSR SAMPLE
5090          BCS .2
5100          BMI .1
5110          CLRA
5120  *-----------------------------------
5130  *       ERROR RETURN
5140  *-----------------------------------
5150  .2      ORA #$01
5160          SEC
5170          RTS
5180  *-----------------------------------
5190  *       TIME OUT TICK
5200  *       32 MSEC (256*128 USEC)
5210  *       TO FIND A 1->0
5220  *       COUNTER  = $FF
5230  *       PRESCALE = $01
5240  *   ==> MAX TICK TIME = 1249 <=
5250  *-----------------------------------
```

```
5260  .3      BRCLR 7,TCR,.3
5270          CLR B.SAVE
5280          LDA #$03
5290          STA X.SAVE
5300          CLR PRESCALE.COUNT
5310          LDA #$FF
5320          STA TDR
5330  .4      LDA #$40
5340          STA TCR
5350          DEC B.SAVE
5360          BNE .5
5370  *----------------------------
5380  *        NO 1->0
5390  *----------------------------
5400          LDA #$06
5410          SEC
5420          RTS
5430  *----------------------------
5440  *        LOOK FOR A ZERO
5450  *----------------------------
5460  .5      BRCLR 4,PORT.B,.7
5470  *----------------------------
5480  *        FOUND A ONE - RESET COUNT
5490  *----------------------------
5500          LDA #$03
5510          STA X.SAVE
5520  .6      BRCLR 7,TCR,.5
5530  *----------------------------
5540  *        COUNT TIMER OVERFLOWS
5550  *----------------------------
5560          INC PRESCALE.COUNT
5570          BRA .4
5580  *----------------------------
5590  *        FOUND A ZERO - COUNT IT
5600  *----------------------------
5610  .7      DEC X.SAVE
5620          BNE .6
5630
5640
5650  *----------------------------
5660  *        CALCULATE PERIOD OF REMOTE
5670  *         UNIT'S TICK CLOCK FROM
5680  *         THE TIME (T) THAT THE
5690  *         START BAUD IS HIGH (28
5700  *         TICKS) AS T/28
5710  *        USE:
5720  *         1/32+1/256+1/2048
5730  *             = .03564
5740  *        TO APPROXIMATE:
5750  *         1/28 = .035714
5760  *        ERROR IS -0.27%
5770  *        T= 128(PRESCALE COUNT)+
5780  *         TIMER COUNT+14*625 USEC
5790  *         = V + 8750 USEC
5800  *        EXECUTION TIME IS   (151)
5810  *----------------------------
5820          LDA #ONE.TWENTY.EIGHT   (2)
5830          STA TCR                 (4)
5840          LDA TDR                 (3)
5850  *----------------------------
5860  *        CORRECT TDR - IT'S A
5870  *        NEGATIVE (COUNT DOWN)
5880  *----------------------------
5890          COMA                    (3)
5900          INCA                    (3)
5910          STA TIMER.COUNT         (4)
5920  *----------------------------
5930  *        COUNT FOR 384 USEC
5940  *        ROUTINE TAKES 340 USEC
5950  *----------------------------
5960          LDA #3                  (2)
5970          STA TDR                 (4)
5980  *----------------------------
5990  *        V/32                    (98)
6000  *----------------------------
6010          LDX #5                  (2)
6020  .10     LSR PRESCALE.COUNT      (5)
6030          ROR TIMER.COUNT         (5)
6040          DECX                    (3)
6050          BNE .10                 (3)
6060          LDA TIMER.COUNT         (3)
6070          STA A.SAVE              (4)
6080          LDA PRESCALE.COUNT      (3)
6090          STA B.SAVE              (5)
6100  *----------------------------
6110  *        V/256                   (47)
6120  *----------------------------
6130          LDX #3                  (2)
6140  .12     LSR B.SAVE              (5)
6150          ROR A.SAVE              (5)
6160          DECX                    (3)
6170          BNE .12                 (3)
6180  *----------------------------
6190  *        V/32+V/256              (20)
6200  *----------------------------
6210          LDA A.SAVE              (3)
6220          ADC TIMER.COUNT         (3)
6230          STA TIMER.COUNT         (4)
6240          LDA B.SAVE              (3)
6250          ADC PRESCALE.COUNT      (3)
6260          STA PRESCALE.COUNT      (4)
6270  *----------------------------
6280  *        V/2048                  (47)
6290  *----------------------------
6300          LDX #3                  (2)
6310  .13     LSR B.SAVE              (5)
6320          ROR A.SAVE              (5)
6330          DECX                    (3)
6340          BNE .13                 (3)
6350  *----------------------------
6360  *        START WITH 1/28 OF TIME
6370  *
6380  *        FOR FIRST 14 TICKS
6390  *        CORRECT FOR CPU TICK
6400  *        PROCESSING TIME
6410  *
6420  *        1/2 TICK TIME   313 USEC
6430  *        CPU TIME        -47
6440  *                        ---
6450  *                        266     (19)
6460  *----------------------------
6470          LDA A.SAVE              (3)
6480          ADD #10                 (2)
6490          STA A.SAVE              (4)
6500          LDA #1                  (3)
6510          ADC B.SAVE              (3)
6520          STA B.SAVE              (4)
6530  *----------------------------
6540  *        ADD TO V/28             (20)
6550  *----------------------------
6560          LDA A.SAVE              (3)
6570          ADD TIMER.COUNT         (3)
6580          STA TIMER.COUNT         (4)
6590          LDA B.SAVE              (3)
6600          ADC PRESCALE.COUNT      (3)
6610          STA PRESCALE.COUNT      (4)
6620  *----------------------------
6630  *        DOUBLE PRESCALE COUNT -
6640  *        IT'S A 7 BIT COUNTER
6650  *        MAKE COUNT < 128        (22)
6660  *----------------------------
6670          LSL PRESCALE.COUNT      (5)
6680          LDA TIMER.COUNT         (3)
```

```
6690            BPL .14                 (3)
6700            AND #$7F                (2)
6710            STA TIMER.COUNT         (4)
6720            INC PRESCALE.COUNT      (5)
6730 *------------------------------------
6740 *      WAIT FOR THE 384 USEC TO
6750 *           TIME OUT
6760 *      RESET THE COUNTER WITH
6770 *         TICK TIME - 384 USEC
6780 *              ( 3 * 128 )
6790 *      ==> MIN TICK TIME = 400 <==
6800 *------------------------------------
6810 .14        BRCLR 7,TCR,.14
6820            LDA PRESCALE.COUNT
6830            DECA
6840            DECA
6850            DECA
6860            BEQ .15
6870 *------------------------------------
6880 *      MORE THAN 128 USEC LEFT
6890 *------------------------------------
6900            STA TDR
6910            LDA #ONE.TWENTY.EIGHT
6920            STA TCR
6930            JSR FINISH.TICK
6940            BRA .16
6950 *------------------------------------
6960 *      LESS THAN 128 USEC LEFT
6970 *------------------------------------
6980 .15        LDA #UNITY.PRESCALE
6990            STA TCR
7000            LDA TIMER.COUNT
7010            STA TDR
7020            JSR FINISH.TICK.2
7030 .16        CLC
7040            RTS
7050
7060 ************************************
7070 *      3 OUT OF 4 SAMPLES AT       *
7080 *      TICKS 13 THRU 15 MUST       *
7090 *      BE ZERO FOR VALID END       *
7100 ************************************
7110
7120 BAUD.END
7130            JSR FINISH.TICK
7140 *------------------------------------
7150 *      SAMPLE TICK 13
7160 *------------------------------------
7170            JSR SAMPLE
7180            BCS NO.END
7190            BMI NO.END
7200            JSR FINISH.TICK
7210 MARK.END
7220 *------------------------------------
7230 *      SAMPLE TICK 14
7240 *------------------------------------
7250            JSR SAMPLE
7260            BCS NO.END
7270            BMI NO.END
7280            JSR FINISH.TICK
7290 *------------------------------------
7300 *      SAMPLE TICK 15
7310 *------------------------------------
7320            JSR SAMPLE
7330            BCS NO.END
7340            BMI NO.END
7350            CLC
7360            RTS
7370 *------------------------------------
7380 *      NO VALID END
7390 *------------------------------------
7400 NO.END
7410            ORA #$02
7420            SEC
7430            RTS
7440
7450 ************************************
7460 *      LOOKS FOR A DATA ZERO       *
7470 *      AND ALL ZEROS AT TICKS     *
7480 *         16 THRU 31              *
7490 ************************************
7500
7510 EOM
7520 *------------------------------------
7530 *      LOOK FOR A DATA 0
7540 *------------------------------------
7550            JSR DATA.BIT
7560            BCS .3
7570            BMI .2
7580 *------------------------------------
7590 *      DELAY TILL TICK 13
7600 *      LOOK FOR BAUD END
7610 *------------------------------------
7620            LDA #4
7630            STA X.SAVE
7640            JSR CONTINUE.DELAY
7650            JSR BAUD.END
7660            BCS .3
7670 *------------------------------------
7680 *      LOOK FOR A DATA 0
7690 *------------------------------------
7700            JSR DATA.BIT
7710            BCS .3
7720            BMI .2
7730 *------------------------------------
7740 *      DELAY TILL TICK 13
7750 *      LOOK FOR BAUD END
7760 *------------------------------------
7770            LDA #4
7780            STA X.SAVE
7790            JSR CONTINUE.DELAY
7800            JSR BAUD.END
7810            BCS .3
7820 *------------------------------------
7830 *      PASS RETURN
7840 *------------------------------------
7850            CLC
7860            RTS
7870 *------------------------------------
7880 *      FAIL RETURN
7890 *------------------------------------
7900 .2         CLRA
7910 .3         ORA #2
7920            SEC
7930            RTS
7940
7950 ************************************
7960 *      TIMES OUT THE CURRENT       *
7970 *      TICK AND STARTS ANOTHER     *
7980 ************************************
7990
8000 FINISH.TICK
8010 .1         BRCLR 7,TCR,.1
8020            LDA #UNITY.PRESCALE
8030            STA TCR
8040            LDA TIMER.COUNT
8050            STA TDR
8060 FINISH.TICK.2
8070 .2         BRCLR 7,TCR,.2
8080            LDA #ONE.TWENTY.EIGHT
8090            STA TCR
8100            LDA PRESCALE.COUNT
```

```
8110        STA TDR
8120        RTS
8130
8140 ***********************************
8150 *      TOGGLES DOT STROBE        *
8160 *      OUTPUTS A 17 USEC         *
8170 *      ADDS 40 USEC WHEN CALLED  *
8180 ***********************************
8190
8200 SHOW.SAMPLE
8210        STA X.SAVE          (3)
8220        LDA #DOT.STROBE     (2)
8230        STA PORT.B          (2)
8240        JSR KNOWN.RTS       (6)
8250        LDA #CLEAR.STROBE   (3)
8260        STA PORT.B          (2)
8270        LDA X.SAVE          (3)
8280 KNOWN.RTS
8290        RTS                 (6)

1000 *SAVE PORTA D
1001 *********************************
1002 *      PORTA POLLER PROM D      *
1003 *********************************
1004
1010 *********************************
1020 *                               *
1030 *      PRINTER DRIVER           *
1040 *                               *
1050 *      PORT A - DATA STROBE     *
1060 *         $01   SW COLUMN 1     *
1070 *         $02   SW COLUMN 2     *
1080 *         $04   SW COLUMN 3     *
1090 *         $08   SW COLUMN 4     *
1100 *         $10   SW COLUMN 5     *
1110 *         $20   LINE DATA       *
1120 *         $40   LINE HI Z STATE *
1130 *         $80   MOTOR ON        *
1140 *                               *
1150 *      PORT A - DOT STROBE      *
1160 *         $01   DOT 1           *
1170 *         $02   DOT 2           *
1180 *         $04   DOT 3           *
1190 *         $08   DOT 4           *
1200 *         $10   DOT 5           *
1210 *         $20   DOT 6           *
1220 *         $40   DOT 7           *
1230 *         $80   -----           *
1240 *                               *
1250 *      PORT B                   *
1260 *         $01   UNIT SW STROBE  *
1270 *         $02   KEY SW STROBE   *
1280 *         $04   DOT STROBE      *
1290 *         $08   LED STROBE      *
1300 *         $10   RCVR DATA       *
1310 *         $20   HOME SWITCH     *
1320 *         $40   TACHO IN        *
1330 *         $80   PWR SUPPLY STATE*
1340 *                               *
1350 *********************************
1360
1370 PRINT
1380
1390 *-------------------------------
1400 *      SET PORT A TO WRITE MODE
1410 *      TURN PRINTER MOTOR ON
1420 *-------------------------------
1430        LDA #WRITE.A
1440        STA DDR.A
1450        JSR TURN.MOTOR.ON

8300 *-------------------------------
8310 END
8320 *-------------------------------
8330 *      INTERRUPT VECTORS
8340 *
8350 *      .OR $1FF6
8360 *      .TF P.P.VECTORS.$2FF6
8370 *
8380 *-------------------------------
8390 WAIT
8400        .DA COLD.START
8410 TIMER
8420        .DA COLD.START
8430 IRQ
8440        .DA COLD.START
8450 SWI
8460        .DA COLD.START
8470 POWER.ON.RESET
8480        .DA COLD.START
8490 *-------------------------------

1460 *-------------------------------
1470 *      LOOK FOR A 0, 1, 0
1480 *      SEQUENCE FROM THE TACHO
1490 *-------------------------------
1500 .1     BRSET 6,PORT.B,.1
1510 .2     BRCLR 6,PORT.B,.2
1520 .3     BRSET 6,PORT.B,.3
1530 *-------------------------------
1540 *      PRINT THE 16 CHARACTERS
1550 *-------------------------------
1560        CLR X.SAVE
1570 .4     JSR PRINT.CHARACTER
1580        INC X.SAVE
1590        LDA #16
1600        CMP X.SAVE
1610        BNE .4
1620 *-------------------------------
1630 *      LAST CHARACTER PRINTED
1640 *      TURN OFF PRINTER MOTOR
1650 *      SET PORT A TO READ MODE
1660 *-------------------------------
1670        JSR TURN.MOTOR.OFF
1680        LDA #READ.A
1690        STA DDR.A
1700        RTS
1710
1720
1730 ***********************************
1740 *      PRINT THE 5 COLUMN        *
1750 *      PATTERNS THAT MAKE A      *
1760 *      CHARACTER                 *
1770 ***********************************
1780
1790 PRINT.CHARACTER
1800        LDX X.SAVE
1810        LDX PRINT.BUFFER,X
1820 *-------------------------------
1830 *      LOAD THE DATA WHEN THE
1840 *      SINGLE SHOT IS LOW -
1850 *      HANG AROUND TILL IT GOES
1860 *      HI AT BURN TIME
1870 *-------------------------------
1880 .1     BRSET 6,PORT.B,.1
1890        LDA COL.1-$20,X
1900        JSR LOAD.DOT.LATCH
1910 .2     BRCLR 6,PORT.B,.2
1920 *-------------------------------
1930 *      COLUMN 2
1940 *-------------------------------
1950 .3     BRSET 6,PORT.B,.3
```

```
1960         LDA COL.2-$20,X
1970         JSR LOAD.DOT.LATCH
1980  .4     BRCLR 6,PORT.B,.4
1990 *----------------------------------
2000 *          COLUMN 3
2010 *----------------------------------
2020  .5     BRSET 6,PORT.B,.5
2030         LDA COL.3-$20,X
2040         JSR LOAD.DOT.LATCH
2050  .6     BRCLR 6,PORT.B,.6
2060 *----------------------------------
2070 *          COLUMN 4
2080 *----------------------------------
2090  .7     BRSET 6,PORT.B,.7
2100         LDA COL.4-$20,X
2110         JSR LOAD.DOT.LATCH
2120  .8     BRCLR 6,PORT.B,.8
2130 *----------------------------------
2140 *          COLUMN 5
2150 *----------------------------------
2160  .9     BRSET 6,PORT.B,.9
2170         LDA COL.5-$20,X
2180         JSR LOAD.DOT.LATCH
2190  .10    BRCLR 6,PORT.B,.10
2200 *----------------------------------
2210 *          COLUMN 6 - BLANK
2220 *----------------------------------
2230  .11    BRSET 6,PORT.B,.11
2240         CLRA
2250         JSR LOAD.DOT.LATCH
2260  .12    BRCLR 6,PORT.B,.12
2270 *----------------------------------
2280 *          COLUMN 7 - BLANK
2290 *----------------------------------
2300  .13    BRSET 6,PORT.B,.13
2310  .14    BRCLR 6,PORT.B,.14
2320         RTS
2330
2340 ************************************
2350 *       LOADS THE DATA IN THE      *
2360 *       ACCUM TO DOT LATCH         *
2370 ************************************
2380
2390 LOAD.DOT.LATCH
2400         STA PORT.A
2410         LDA #DOT.STROBE
2420         STA PORT.B
2430         LDA #CLEAR.STROBE
2440         STA PORT.B
2450         RTS
2460
2470 ************************************
2480 *       TURN THE MOTOR ON          *
2490 ************************************
2500
2510 TURN.MOTOR.ON
2520 *----------------------------------
2530 *       POWER SUPPLY RECOVERED ?
2540 *----------------------------------
2550  .1     BRSET 7,PORT.B,.1
2560         LDA #MOTOR.ON

1000 * SAVE PORTA E
1010 *----------------------------------
1020
1030 ************************************
1040 *       PORTA POLLER PROM E        *
1050 *         VERSION 3.8              *
1060 *       AS OF 15 AUG 1985          *
1070 ************************************
1080

2570         STA PORT.A
2580         LDA #DATA.STROBE
2590         STA PORT.B
2600         LDA #CLEAR.STROBE
2610         STA PORT.B
2620 *----------------------------------
2630 *       HOME SW MUST BE = 0
2640 *       FOR ATLEAST 50 USEC
2650 *       DELAY FOR 7 PASSES
2660 *       THRU A 8 USEC LOOP
2670 *----------------------------------
2680  .2     BRSET 5,PORT.B,.2
2690         LDA #10
2700         STA B.SAVE
2710  .3     BRSET 5,PORT.B,.2
2720         DEC B.SAVE
2730         BNE .3
2740         RTS
2750
2760 ************************************
2770 *       TURN OFF THE MOTOR         *
2780 *       DEBOUNCE HOME SWITCH       *
2790 *       FOR ATLEAST 450 USEC       *
2800 ************************************
2810
2820 TURN.MOTOR.OFF
2830 *----------------------------------
2840 *       SWITCH OPEN AT HOME
2850 *       DELAY FOR 57 PASSES
2860 *       THRU AN 8 USEC LOOP
2870 *----------------------------------
2880  .1     BRCLR 5,PORT.B,.1
2890         LDA #57
2900         STA B.SAVE
2910  .2     BRCLR 5,PORT.B,.1
2920         DEC B.SAVE
2930         BNE .2
2940 *----------------------------------
2950 *       TURN THE MOTOR OFF
2960 *       PORT A => READ MODE
2970 *----------------------------------
2980         LDA #READ.DATA
2990         STA PORT.A
3000         LDA #DATA.STROBE
3010         STA PORT.B
3020         LDA #CLEAR.STROBE
3030         STA PORT.B
3040 *----------------------------------
3050 *       DELAY = 100 PASSES THRU
3060 *       A 1 MSEC LOOP
3070 *----------------------------------
3080         LDA #100
3090         STA A.SAVE
3100  .3     LDA #100
3110         STA B.SAVE
3120  .4     DEC B.SAVE
3130         BNE .4
3140         DEC A.SAVE
3150         BNE .3
3160         RTS
3170 *----------------------------------

1090 ************************************
1100 *       A TRANSMISSION CONSISTS    *
1110 *       FIVE PARTS (18 BAUD)       *
1120 *         START OF MESSAGE  (2)    *
1130 *         ADDRESS           (8)    *
1140 *         DATA              (5)    *
1150 *         PARITY            (1)    *
1160 *         END OF MESSAGE    (2)    *
1170 ************************************
```

```
1180
1190 TRANSMITT
1200 *--------------------------------
1210 *       SET PORT.A TO WRITE
1220 *       SET LINE TO ZERO FOR ABOUT
1230 *       1 MILLISEC BEFORE START OF
1240 *       XMISSION TO INITALIZE
1250 *       RECEIVER CIRCUITRY
1260 *       (128 X 8 USEC)
1270 *--------------------------------
1280           LDA #WRITE.A
1290           STA DDR.A
1300           LDA #SEND.ZERO
1310           JSR LOAD.XMIT.DATA
1320           LDA #128
1330           STA A.SAVE
1340 .1        DEC A.SAVE
1350           BNE .1
1360 *--------------------------------
1370 *       COUNTER TIME EQUALS:
1380 *       TICK TIME       625 USEC
1390 *       CPU TIME (AVG)  -33
1400 *                       ---
1410 *       COUNTS          592
1420 *
1430 *       PRESCALE FACTOR 128
1440 *       PESCALE COUNT   X 4
1450 *                       ---
1460 *                       512
1470 *       COUNT           +80
1480 *                       ---
1490 *       TOTAL COUNTS    592
1500 *       (1 COUNT = 1 USEC)
1510 *--------------------------------
1520           LDA #4
1530           STA PRESCALE.COUNT
1540           LDA #80
1550           STA TIMER.COUNT
1560 *--------------------------------
1570 *       INITALIZE PARITY
1580 *       13 BIT MESSAGE
1590 *       LOAD DATA
1600 *--------------------------------
1610           CLRA
1620           STA PARITY
1630           LDA #13
1640           STA BIT.COUNTER
1650           LDA UNIT.NUMBER
1660 *--------------------------------
1670 *       FIX FOR WRONG DIP SWITCH
1680 *--------------------------------
1690           COMA
1700 *--------------------------------
1710           STA ADDRESS
1720           LDA MESSAGE
1730           STA COMMAND
1740 *--------------------------------
1750 *       SEND THE START OF MESSAGE
1760 *--------------------------------
1770           JSR START.OF.MESSAGE
1780 *--------------------------------
1790 *       RIGHT SHIFT MESSAGE -
1800 *       CARRY HAS DATA BIT
1810 *       MESSAGE => ADDRESS => C
1820 *--------------------------------
1830 .2        DEC BIT.COUNTER
1840           BMI .4
1850           LSR COMMAND
1860           ROR ADDRESS
1870           BCC .3
1880 *--------------------------------
1890 *       DATA BIT IS A ONE
1900 *       INCREMENT PARITY (EVEN)
1910 *--------------------------------
1920           INC PARITY
1930           JSR ONE.BAUD
1940           BRA .2
1950 *--------------------------------
1960 *       DATA BIT IS A ZERO
1970 *--------------------------------
1980 .3        JSR ZERO.BAUD
1990           BRA .2
2000 *--------------------------------
2010 *       DATA IS SENT NOW FIX UP
2020 *       SO THAT THERE IS AN ODD
2030 *       NUMBER OF ONES IN THE
2040 *       MESSAGE
2050 *--------------------------------
2060 .4        LDA PARITY
2070           AND #$01
2080           BEQ .5
2090           JSR ZERO.BAUD
2100           BRA .6
2110 .5        JSR ONE.BAUD
2120 *--------------------------------
2130 *       END OF MESSAGE IS NOW
2140 *       TWO ZERO BAUDS
2150 *--------------------------------
2160 .6        JSR END.OF.MESSAGE
2180 *--------------------------------
2190 *       TRANSMISSON IS OVER
2200 *       LINE TO HI-Z STATE
2210 *       DATA TO ONE (OPTO OFF)
2220 *--------------------------------
2230           LDA #READ.DATA
2240           JSR LOAD.XMIT.DATA
2250           LDA #READ.A
2260           STA DDR.A
2270           RTS
2280
2290 ************************************
2300 *     THE START OF MESSAGE IS    *
2310 *     A ONE FOR 28 TICKS         *
2320 *     A ZERO FOR 4 TICKS         *
2330 *                                *
2340 *     I--------------I    I      *
2350 *     I              I    I      *
2360 *     I              I----I      *
2370 *                                *
2380 *     0              28   32     *
2390 *                                *
2400 ************************************
2410
2420 START.OF.MESSAGE
2430
2440 *--------------------------------
2450 *       OUTPUT A ONE
2460 *       0110 1111 => PORT.A
2470 *--------------------------------
2480           LDA #SEND.ONE
2490           JSR LOAD.XMIT.DATA
2500 *--------------------------------
2510 *       WAIT FOR 28 TICKS
2520 *--------------------------------
2530           LDA #28
2540           STA X.SAVE
2550           JSR TICK.DELAY
2560 *--------------------------------
2570 *       OUTPUT A ZERO
2580 *       0100 1111 => PORT.A
```

```
2590 *-------------------------------------
2600         LDA #SEND.ZERO
2610         JSR LOAD.XMIT.DATA
2620 *-------------------------------------
2630 *     WAIT FOR 4 TICKS
2640 *-------------------------------------
2650         LDA #4
2660         STA X.SAVE
2670         JSR CONTINUE.DELAY
2680 *-------------------------------------
2690 *     NEXT BAUD ALWAYS STARTS
2700 *     WITH A ONE. COUNTER IS
2710 *     CORRECT. HAVE ALMOST A
2720 *     FULL TICK TIME TO DO STUFF
2730 *-------------------------------------
2740         LDA #SEND.ONE
2750         JSR LOAD.XMIT.DATA
2760         RTS
2770
2780 *************************************
2790 *     A DATA ONE BAUD IS         *
2800 *     A ONE FOR 12 TICKS         *
2810 *     A ZERO FOR 4 TICKS         *
2820 *                                *
2830 *     I-----------I    I         *
2840 *     I           I    I         *
2850 *     I           I----I         *
2860 *                                *
2870 *     0           12   16        *
2880 *                                *
2890 *************************************
2900
2910 ONE.BAUD
2920 *-------------------------------------
2930 *     TIME OUT THE PREVIOUSLY
2940 *     SET ONE FOR 12 TICKS
2950 *-------------------------------------
2960         LDA #12
2970         STA X.SAVE
2980         JSR CONTINUE.DELAY
2990 *-------------------------------------
3000 *     OUTPUT A ZERO
3010 *-------------------------------------
3020         LDA #SEND.ZERO
3030         JSR LOAD.XMIT.DATA
3040 *-------------------------------------
3050 *     DELAY 4 TICKS
3060 *-------------------------------------
3070         LDA #4
3080         STA X.SAVE
3090         JSR CONTINUE.DELAY
3100 *-------------------------------------
3110 *     ALWAYS END WITH A ONE
3120 *-------------------------------------
3130         LDA #SEND.ONE
3140         JSR LOAD.XMIT.DATA
3150         RTS
3160
3170 *************************************
3180 *     A DATA ZERO BAUD IS        *
3190 *     A ONE FOR 4 TICKS          *
3200 *     A ZERO FOR 12 TICKS        *
3210 *                                *
3220 *     I----I               I     *
3230 *     I    I               I     *
3240 *     I    I---------------I     *
3250 *                                *
3260 *     0    4               16    *
3270 *                                *
3280 *************************************
3290
3300 ZERO.BAUD
3310 *-------------------------------------
3320 *     TIME OUT THE PREVIOUSLY
3330 *     SET ONE FOR 4 TICKS
3340 *-------------------------------------
3350         LDA #4
3360         STA X.SAVE
3370         JSR CONTINUE.DELAY
3380 *-------------------------------------
3390 *     OUTPUT A ZERO
3400 *-------------------------------------
3410         LDA #SEND.ZERO
3420         JSR LOAD.XMIT.DATA
3430 *-------------------------------------
3440 *     DELAY 12 TICKS
3450 *-------------------------------------
3460         LDA #12
3470         STA X.SAVE
3480         JSR CONTINUE.DELAY
3490 *-------------------------------------
3500 *     END WITH A ONE
3510 *-------------------------------------
3520         LDA #SEND.ONE
3530         JSR LOAD.XMIT.DATA
3540         RTS
3550
3560 *************************************
3570 *     THE END OF MESSAGE IS      *
3580 *     TWO DATA ZEROS             *
3600 *                                *
3610 *     I----I      I---I      I   *
3620 *     I    I      I   I      I   *
3630 *     I    I------I   I------I   *
3640 *                                *
3650 *     0    4      16  20     32  *
3660 *                                *
3670 *************************************
3680
3690 END.OF.MESSAGE
3720 *-------------------------------------
3730 *     SEND TWO ZEROS
3750 *-------------------------------------
3760         JSR ZERO.BAUD
3770         JSR ZERO.BAUD
3780         RTS
3910
3920 *************************************
3930 *     DELAYS FOR "X.SAVE"        *
3940 *     62.5 USEC TICKS            *
3950 *************************************
3960
3970 TICK.DELAY
3980 .1      LDA #ONE.TWENTY.EIGHT
3990         STA TCR
4000         LDA PRESCALE.COUNT
4010         STA TDR
4020 .2      BRCLR 7,TCR,.2
4030         LDA #UNITY.PRESCALE
4040         STA TCR
4050         LDA TIMER.COUNT
4060         STA TDR
4070 .3      BRCLR 7,TCR,.3
4080         DEC X.SAVE
4090         BNE .1
4100 *-------------------------------------
4110 *     START THE NEXT DELAY SO
4120 *     WE DON'T LOSE ANY TIME
4130 *-------------------------------------
4140         LDA #ONE.TWENTY.EIGHT
4150         STA TCR
4160         LDA PRESCALE.COUNT
4170         STA TDR
4180         RTS
```

```
4190
4200  ****************************************
4210  *      CONTINUES A DELAY              *
4220  *      FOR "X.SAVE" TICKS             *
4230  ****************************************
4240
4250  CONTINUE.DELAY
4260  *----------------------------------------
4270  *      TIME OUT THIS TICK
4280  *----------------------------------------
4290  .1    BRCLR 7,TCR,.1
4300        LDA #UNITY.PRESCALE
4310        STA TCR
4320        LDA TIMER.COUNT
4330        STA TDR
4340  .2    BRCLR 7,TCR,.2
4350        DEC X.SAVE
4360  *----------------------------------------
4370  *      START A NEW TICK
4380  *----------------------------------------
4390  .3    LDA #ONE.TWENTY.EIGHT
4400        STA TCR
4410        LDA PRESCALE.COUNT
4420        STA TDR
4430  .4    BRCLR 7,TCR,.4
4440        LDA #UNITY.PRESCALE
4450        STA TCR
4460        LDA TIMER.COUNT
4470        STA TDR
4480  .5    BRCLR 7,TCR,.5
4490        DEC X.SAVE
4500        BNE .3
4510  *----------------------------------------
4520  *      START THE NEXT DELAY SO
4530  *      WE DON'T LOSE ANY TIME
4540  *----------------------------------------
4550        LDA #ONE.TWENTY.EIGHT
4560        STA TCR
4570        LDA PRESCALE.COUNT
4580        STA TDR
4590        RTS
4600
4610  ****************************************
4620  *                                      *
4630  *      LOADS ACCUMULATOR TO            *
4640  *      DATA LATCH                      *
4650  ****************************************
4660
4670  LOAD.XMIT.DATA
4680        STA PORT.A
4690        LDA #DATA.STROBE
4700        STA PORT.B
4710        LDA #CLEAR.STROBE
4720        STA PORT.B
4730        RTS
4740
4750  *----------------------------------------

1000  *SAVE PORTA C
1010  ****************************************
1020  *                                      *
1030  *      PORTA POLLER PROM C             *
1040  *                                      *
1050  *      AS OF 1 SEPT 1984               *
1060  *                                      *
1070  ****************************************
1080  *----------------------------------------
1090  *      THE DOT PATTERNS FOR
1100  *      ASCII $20 THRU $5F
1110  *      0-9, A-Z AND MISC CHAR.
1120  *      LISTED BY COLUMNS (1-5)
1130  *
1140  *      HEX      BIT NO.  ASCII
1150  *      VALUE    0 ---- 7 CHAR
1160  *----------------------------------------
1170  COL.1
1180        .HS 00   00000000  SPACE
1190        .HS 00   00000000  !
1200        .HS 00   00000000  "
1210        .HS 14   00101000  #
1220        .HS 24   00100100  $
1230        .HS 23   11000100  %
1240        .HS 36   01101100  &
1250        .HS 00   00000000  '
1260        .HS 00   00000000  (
1270        .HS 00   00000000  )
1280        .HS 12   01001000  *
1290        .HS 08   00010000  +
1300        .HS 00   00000000  ,
1310        .HS 08   00010000  -
1320        .HS 00   00000000  .
1330        .HS 40   00000010  /
1340        .HS 3E   01111100  0
1350        .HS 00   00000000  1
1360        .HS 42   01000010  2
1370        .HS 21   10000100  3
1380        .HS 18   00011000  4
1390        .HS 27   11100100  5
1400        .HS 3C   00111100  6
1410        .HS 01   10000000  7
1420        .HS 36   01101100  8
1430        .HS 06   01100000  9
1440        .HS 00   00000000  :
1450        .HS 00   00000000  ;
1460        .HS 08   00010000  <
1470        .HS 14   00101000  =
1480        .HS 00   00000000  >
1490        .HS 02   01000000  ?
1500        .HS 32   01001100  AT
1510        .HS 7C   00111110  A
1520        .HS 7F   11111110  B
1530        .HS 3E   01111100  C
1540        .HS 7F   11111110  D
1550        .HS 7F   11111110  E
1560        .HS 7F   11111110  F
1570        .HS 3E   01111100  G
1580        .HS 7F   11111110  H
1590        .HS 00   00000000  I
1600        .HS 40   00000010  J
1610        .HS 7F   11111110  K
1620        .HS 7F   11111110  L
1630        .HS 7F   11111110  M
1640        .HS 7F   11111110  N
1650        .HS 3E   01111100  O
1660        .HS 7F   11111110  P
1670        .HS 3E   01111100  Q
1680        .HS 7F   11111110  R
1690        .HS 26   01100100  S
1700        .HS 01   10000000  T
1710        .HS 3F   11111100  U
1720        .HS 1F   11111000  V
1730        .HS 3F   11111100  W
1740        .HS 63   11000110  X
1750        .HS 07   11100000  Y
1760        .HS 61   10000110  Z
1770        .HS 00   00000000  L. BRACK
1780        .HS 02   01000000  R. SLASH
1790        .HS 00   00000000  ]
1800        .HS 04   00100000  ^
1810        .HS 40   00000010  U LINE
```

```
1820 *--------------------------------
1830 COL.2
1840       .HS 00    00000000  SPACE
1850       .HS 00    00000000  !
1860       .HS 07    11100000  "
1870       .HS 7F    11111110  #
1880       .HS 2A    01010100  $
1890       .HS 13    11001000  %
1900       .HS 49    10010010  &
1910       .HS 05    10100000  '
1920       .HS 1C    00111000  (
1930       .HS 41    10000010  )
1940       .HS 0C    00110000  *
1950       .HS 08    00010000  +
1960       .HS 50    00001010  ,
1970       .HS 08    00010000  -
1980       .HS 60    00000110  .
1990       .HS 10    00001000  /
2000       .HS 51    10001010  0
2010       .HS 42    01000010  1
2020       .HS 62    01000110  2
2030       .HS 41    10000010  3
2040       .HS 14    00101000  4
2050       .HS 45    10100010  5
2060       .HS 4A    01010010  6
2070       .HS 71    10001110  7
2080       .HS 49    10010010  8
2090       .HS 49    10010010  9
2100       .HS 36    01101100  :
2110       .HS 56    01101010  ;
2120       .HS 14    00101000  <
2130       .HS 14    00101000  =
2140       .HS 41    10000010  >
2150       .HS 01    10000000  ?
2160       .HS 49    10010010  AT
2170       .HS 12    01001000  A
2180       .HS 49    10010010  B
2190       .HS 41    10000010  C
2200       .HS 41    10000010  D
2210       .HS 49    10010010  E
2220       .HS 09    10010000  F
2230       .HS 41    10000010  G
2240       .HS 08    00010000  H
2250       .HS 41    10000010  I
2260       .HS 40    00000010  J
2270       .HS 08    00010000  K
2280       .HS 40    00000010  L
2290       .HS 02    01000000  M
2300       .HS 04    00100000  N
2310       .HS 41    10000010  O
2320       .HS 09    10010000  P
2330       .HS 41    10000010  Q
2340       .HS 09    10010000  R
2350       .HS 49    10010010  S
2360       .HS 01    10000000  T
2370       .HS 40    00000010  U
2380       .HS 20    00000100  V
2390       .HS 40    00000010  W
2400       .HS 14    00101000  X
2410       .HS 08    00010000  Y
2420       .HS 51    10001010  Z
2430       .HS 7F    11111110  L. BRACK
2440       .HS 04    00100000  R. SLASH
2450       .HS 41    10000010  ]
2460       .HS 02    01000000  ^
2470       .HS 40    00000010  U LINE
2480 *--------------------------------
2490 COL.3
2500       .HS 00    00000000  SPACE
2510       .HS 4F    11110010  !
2520       .HS 00    00000000  "
2530       .HS 14    00101000  #
2540       .HS 7F    11111110  $
2550       .HS 08    00010000  %
2560       .HS 55    10101010  &
2570       .HS 03    11000000  '
2580       .HS 22    01000100  (
2590       .HS 22    01000100  )
2600       .HS 3F    11111100  *
2610       .HS 3E    01111110  +
2620       .HS 30    00001100  ,
2630       .HS 08    00010000  -
2640       .HS 60    00000110  .
2650       .HS 08    00010000  /
2660       .HS 49    10010010  0
2670       .HS 7F    11111110  1
2680       .HS 51    10001010  2
2690       .HS 45    10100010  3
2700       .HS 12    01001000  4
2710       .HS 45    10100010  5
2720       .HS 59    10011010  6
2730       .HS 09    10010000  7
2740       .HS 49    10010010  8
2750       .HS 49    10010010  9
2760       .HS 36    01101100  :
2770       .HS 36    01101100  ;
2780       .HS 22    01000100  <
2790       .HS 14    00101000  =
2800       .HS 22    01000100  >
2810       .HS 51    10001010  ?
2820       .HS 79    10011110  AT
2830       .HS 11    10001000  A
2840       .HS 49    10010010  B
2850       .HS 41    10000010  C
2860       .HS 41    10000010  D
2870       .HS 49    10010010  E
2880       .HS 09    10010000  F
2890       .HS 49    10010010  G
2900       .HS 08    00010000  H
2910       .HS 7F    11111110  I
2920       .HS 41    10000010  J
2930       .HS 14    00101000  K
2940       .HS 40    00000010  L
2950       .HS 0C    00110000  M
2960       .HS 08    00010000  N
2970       .HS 41    10000010  O
2980       .HS 09    10010000  P
2990       .HS 51    10001010  Q
3000       .HS 19    10011000  R
3010       .HS 49    10010010  S
3020       .HS 7F    11111110  T
3030       .HS 40    00000010  U
3040       .HS 40    00000010  V
3050       .HS 38    00011100  W
3060       .HS 08    00010000  X
3070       .HS 70    00001110  Y
3080       .HS 49    10010010  Z
3090       .HS 41    10000010  L. BRACK
3100       .HS 08    00010000  R. SLASH
3110       .HS 41    10000010  ]
3120       .HS 01    10000000  ^
3130       .HS 40    00000010  U LINE
3140 *--------------------------------
3150 COL.4
3160       .HS 00    00000000  SPACE
3170       .HS 00    00000000  !
3180       .HS 07    11100000  "
3190       .HS 7F    11111110  #
3200       .HS 2A    01010100  $
3210       .HS 64    00100110  %
3220       .HS 22    01000100  &
3230       .HS 00    00000000  '
```

```
3240        .HS 41   10000010 (
3250        .HS 1C   00111000 )
3260        .HS 0C   00110000 *
3270        .HS 08   00010000 +
3280        .HS 00   00000000 ,
3290        .HS 08   00010000 -
3300        .HS 00   00000000 .
3310        .HS 04   00100000 /
3320        .HS 45   10100010 0
3330        .HS 40   00000010 1
3340        .HS 49   10010010 2
3350        .HS 4B   10010010 3
3360        .HS 7F   11111110 4
3370        .HS 45   10100010 5
3380        .HS 49   10010010 6
3390        .HS 05   10100000 7
3400        .HS 49   10010010 8
3410        .HS 29   10010100 9
3420        .HS 00   00000000 :
3430        .HS 00   00000000 ;
3440        .HS 41   10000010 <
3450        .HS 14   00101000 =
3460        .HS 14   00101000 >
3470        .HS 09   10010000 ?
3480        .HS 41   10000010 AT
3490        .HS 12   01001000 A
3500        .HS 49   10010010 B
3510        .HS 41   10000010 C
3520        .HS 22   01000100 D
3530        .HS 49   10010010 E
3540        .HS 09   10010000 F
3550        .HS 49   10010010 G
3560        .HS 08   00010000 H
3570        .HS 41   10000010 I
3580        .HS 3F   11111100 J
3590        .HS 22   01000100 K
3600        .HS 40   00000010 L
3610        .HS 02   01000000 M
3620        .HS 10   00001000 N
3630        .HS 41   10000010 O
3640        .HS 09   10010000 P
3650        .HS 21   10000100 Q
3660        .HS 29   19919199 R
3670        .HS 49   10010010 S
3680        .HS 01   10000000 T
3690        .HS 40   00000010 U
3700        .HS 20   00000100 V
3710        .HS 40   00000010 W
3720        .HS 14   00101000 X
3730        .HS 08   00010000 Y
3740        .HS 45   10100010 Z
3750        .HS 41   10000010 L. BRACK
3760        .HS 10   00001000 R. SLASH
3770        .HS 7F   11111110 ]
3780        .HS 02   01000000 ^
3790        .HS 40   00000010 U LINE
3800 *-----------------------------------
3810 COL.5
3820        .HS 00   00000000 SPACE
3830        .HS 00   00000000 !
3840        .HS 00   00000000 "
3850        .HS 14   00101000 #
3860        .HS 12   01001000 $
3870        .HS 62   01000110 %
3880        .HS 50   00001010 &
3890        .HS 00   00000000 '
3900        .HS 00   00000000 (
3910        .HS 00   00000000 )
3920        .HS 12   01001000 *
3930        .HS 08   00010000 +
3940        .HS 00   00000000 ,
3950        .HS 08   00010000 -
3960        .HS 00   00000000 .
3970        .HS 02   01000000 /
3980        .HS 3E   01111100 0
3990        .HS 00   00000000 1
4000        .HS 46   01100010 2
4010        .HS 31   10001100 3
4020        .HS 10   00001000 4
4030        .HS 39   10011100 5
4040        .HS 30   00001100 6
4050        .HS 03   11000000 7
4060        .HS 36   01101100 8
4070        .HS 1E   01111000 9
4080        .HS 00   00000000 :
4090        .HS 00   00000000 ;
4100        .HS 00   00000000 <
4110        .HS 14   00101000 =
4120        .HS 08   00010000 >
4130        .HS 06   01100000 ?
4140        .HS 3E   01111100 AT
4150        .HS 7C   00111110 A
4160        .HS 36   01101100 B
4170        .HS 22   01000100 C
4180        .HS 1C   00111000 D
4190        .HS 41   10000010 E
4200        .HS 01   10000000 F
4210        .HS 7A   01011110 G
4220        .HS 7F   11111110 H
4230        .HS 00   00000000 I
4240        .HS 01   10000000 J
4250        .HS 41   10000010 K
4260        .HS 40   00000010 L
4270        .HS 7F   11111110 M
4280        .HS 7F   11111110 N
4290        .HS 3E   01111100 O
4300        .HS 06   01100000 P
4310        .HS 5E   01111010 Q
4320        .HS 46   01100010 R
4330        .HS 32   01001100 S
4340        .HS 01   10000000 T
4350        .HS 3F   11111100 U
4360        .HS 1F   11111000 V
4370        .HS 3F   11111100 W
4380        .HS 63   11000110 X
4390        .HS 07   11100000 Y
4400        .HS 43   11000010 Z
4410        .HS 00   00000000 L. BRACK
4420        .HS 20   00000100 R. SLASH
4430        .HS 00   00000000 ]
4440        .HS 04   00100000 ^
4450        .HS 40   00000010 U LINE
4460 *-----------------------------------
1000 *SAVE PORTA B
1010 ******************************
1020 *                            *
1030 *      PORTA POLLER PROM     *
1040 *                            *
1050 *    AS OF 21 JANUARY 1986   *
1060 *                            *
1070 ******************************
1080
1090
1100 ******************************
1110 *   PRINTS A DASH LINE AND   *
1120 *   THE SELECTED COMMAND     *
1130 *                            *
1140 *   ----------------------   *
1150 *      "STATUS REPORT"       *
1160 *      "5 MINUTE TEST"       *
1170 *      "30 MINUTE TEST"      *
1180 *                            *
1190 ******************************
```

```
1200
1210 TEXT.1
1220         .AT /STATUS REPORT/
1230         .AT /5 MINUTE TEST/
1240         .AT /30 MINUTE TEST/
1250
1260 PRINT.COMMAND
1270         JSR LOAD.DASH.LINE
1280         JSR PRINT.ONE.LINE
1290         JSR CLEAR.BUFFER
1300         CLR A.SAVE
1310         CLRX
1320         LDA MESSAGE
1330         CMP #XMIT.STATUS
1340         BEQ .1
1350         LDX #13
1360         CMP #XMIT.5.MIN.TEST
1370         BEQ .1
1380         LDX #26
1390 .1      STX B.SAVE
1400 .2      LDX B.SAVE
1410         LDA TEXT.1,X
1420         BMI .3
1430         INCX
1440         STX B.SAVE
1450         LDX A.SAVE
1460         STA PRINT.BUFFER,X
1470         INCX
1480         STX A.SAVE
1490         BRA .2
1500 .3      AND #$7F
1510         LDX A.SAVE
1520         STA PRINT.BUFFER,X
1530         JSR PRINT.ONE.LINE
1540         JSR LINE.FEED
1550         RTS
1560
1570 ***********************************
1580 *       PRINTS THE SCAN RANGE     *
1590 *                                 *
1600 *         "SCAN ALL UNITS"        *
1610 *         "SCAN ONE UNIT"         *
1620 *                                 *
1630 ***********************************
1640 TEXT.2
1650         .AT /SCAN ALL UNITS/
1660         .AT /SCAN ONE UNIT/
1670
1680 PRINT.RANGE
1690         CLR A.SAVE
1700         CLRX
1710         LDA SCAN.LENGTH
1720         BMI .1
1730         LDX #14
1740 .1      STX B.SAVE
1750 .2      LDX B.SAVE
1760         LDA TEXT.2,X
1770         BMI .3
1780         INCX
1790         STX B.SAVE
1800         LDX A.SAVE
1810         STA PRINT.BUFFER,X
1820         INCX
1830         STX A.SAVE
1840         BRA .2
1850 .3      AND #$7F
1860         LDX A.SAVE
1870         STA PRINT.BUFFER,X
1880         JSR PRINT.ONE.LINE
1890 *-----------------------------
1900 *       IF ALL UNITS SCAN - PRINT
1910 *       "STARTING AT"
1920 *-----------------------------
1930         LDA SCAN.LENGTH
1940         BPL .4
1950         CLRA
1960         JSR PRINT.START.END
1970 .4      JSR LINE.FEED
1980         RTS
1990
2000 ***********************************
2010 *       PRINTS UNIT NUMBER        *
2020 *                                 *
2030 *          "UNIT: XX"             *
2040 *                                 *
2050 ***********************************
2060
2070 TEXT.3
2080         .AT /UNIT: /
2090
2100 PRINT.NUMBER
2110         CLRX
2120 .1      LDA TEXT.3,X
2130         BMI .2
2140         STA PRINT.BUFFER,X
2150         INCX
2160         BRA .1
2170 .2      AND #$7F
2180         STA PRINT.BUFFER,X
2190         INCX
2200         LDA UNIT.NUMBER
2210         STA A.SAVE
2220         JSR LOAD.HEX
2230         JSR PRINT.ONE.LINE
2240         RTS
2250
2260 ***********************************
2270 *       LOADS A SAVE (IN HEX)     *
2280 *       TO PRINT BUFFER           *
2290 ***********************************
2300
2310 LOAD.HEX
2320         LDA A.SAVE
2330         JSR LEFT.NIBBLE
2340         STA PRINT.BUFFER,X
2350         INCX
2360         LDA A.SAVE
2370         JSR RIGHT.NIBBLE
2380         STA PRINT.BUFFER,X
2390         INCX
2400         RTS
2410
2420 ***********************************
2430 *       PRINTS                    *
2440 *                                 *
2450 *       "NO REPLY "               *
2460 *                                 *
2470 ***********************************
2480
2490 TEXT.4
2500         .AT /NO REPLY  /
2510
2520 PRINT.NO.REPLY
2530 .1      LDA TEXT.4,X
2540         BMI .2
2550         STA PRINT.BUFFER,X
2560         INCX
2570         BRA .1
2580 .2      AND #$7F
2590         STA PRINT.BUFFER,X
2600         JSR PRINT.ONE.LINE
2610         JSR LINE.FEED
2620         RTS
```

```
2630
2640
2650 ******************************
2660 *      PRINTS REPLY TO START     *
2670 *         SELF TEST              *
2680 *                                *
2690 *        "NOT STARTED"           *
2700 *        "TEST STARTED"          *
2710 *                                *
2720 ******************************
2730
2740 TEXT.5
2750         .AT /NOT STARTED/
2760         .AT /TEST STARTED/
2770
2780 PRINT.START.TEST.REPLY
2790         CLRX
2800         LDA REPLY
2801         AND #$1F
2810         BEQ .1
2820         LDX #11
2830 .1      STX X.SAVE
2840         CLR A.SAVE
2850 .2      LDX X.SAVE
2860         LDA TEXT.5,X
2870         BMI .3
2880         INCX
2890         STX X.SAVE
2900         LDX A.SAVE
2910         STA PRINT.BUFFER,X
2920         INCX
2930         STX A.SAVE
2940         BRA .2
2950 .3      AND #$7F
2960         LDX A.SAVE
2970         STA PRINT.BUFFER,X
2980         JSR PRINT.ONE.LINE
2990         JSR LINE.FEED
3000         RTS
3010
3020 ******************************
3021 *                                *
3030 *   IF ALL UNITS SCAN PRINTS     *
3040 *                                *
3050 *      "ENDING AT                *
3060 *       UNIT : XX"               *
3070 *                                *
3080 *   THEN ALWAYS PRINTS           *
3090 *                                *
3100 *    "DATE............           *
3110 *     ACCEPTED BY:               *
3120 *                                *
3130 *     ................"          *
3140 *                                *
3150 ******************************
3160
3170 TEXT.6
3180         .AT /DATE........../
3190 TEXT.7
3200         .AT /ACCEPTED BY:/
3210
3220 PRINT.ACCEPTANCE
3230         CLRX
3240         LDA SCAN.LENGTH
3250         BPL .1
3260         LDA #1
3270         JSR PRINT.START.END
3280         JSR PRINT.NUMBER
3290         JSR LINE.FEED
3300 .1      LDA TEXT.6,X
3310         BMI .2
3320         STA PRINT.BUFFER,X
3330         INCX
3340         BRA .1
3350 .2      AND #$7F
3360         STA PRINT.BUFFER,X
3370         JSR PRINT.ONE.LINE
3380 .3      LDA TEXT.7,X
3390         BMI .4
3400         STA PRINT.BUFFER,X
3410         INCX
3420         BRA .3
3430 .4      AND #$7F
3440         STA PRINT.BUFFER,X
3450         JSR PRINT.ONE.LINE
3460         JSR LINE.FEED
3470         JSR LOAD.DOTTED.LINE
3480         JSR PRINT.ONE.LINE
3490         JSR LOAD.DASH.LINE
3500         JSR PRINT.ONE.LINE
3510         JSR LINE.FEED
3520         RTS
3530
3540 ******************************
3550 *      PRINTS THE STATUS         *
3560 *      REPORTED BY THE UNIT      *
3570 ******************************
3580
3590 TEXT.8
3600         .AT /=CURRENT STATUS=/
3610 TEXT.81
3620         .AT / CHARGE CYCLE:/
3630 TEXT.9
3640         .AT /   COMPLETED/
3650         .AT /   IN PROGRESS/
3660 TEXT.10
3670         .AT / CHARGER:  /
3680 TEXT.11
3690         .AT / ELECTROLYTE/
3700 TEXT.12
3710         .AT /  LEVEL:  FAIL/
3720 TEXT.13
3730         .AT /=PER LAST TEST=/
3740
3750 PRINT.STATUS
3760
3770 *--------------------------------
3780 *   SKIP IF STATUS IS NORMAL
3790 *--------------------------------
3800         LDA REPLY
3810         AND #$1D
3820         BNE .1
3830         JMP NORMAL.STATUS
3840 *--------------------------------
3850 *   PRINTS
3860 *   "CURRENT STATUS"
3870 *--------------------------------
3880 .1      LDA TEXT.8,X
3890         BMI .2
3900         STA PRINT.BUFFER,X
3910         INCX
3920         BRA .1
3930 .2      AND #$7F
3940         STA PRINT.BUFFER,X
3950         JSR PRINT.ONE.LINE
4360 *--------------------------------
4370 *   PRINT STATUS OF CHARGER
4380 *
4390 *   "CHARGER:"
4400 *--------------------------------
4410 .8      LDA TEXT.10,X
4420         BMI .9
4430         STA PRINT.BUFFER,X
4440         INCX
```

```
4450            BRA .8
4460  .9        AND #$7F
4470            STA PRINT.BUFFER,X
4480            INCX
4490 *----------------------------------
4500 *          FAIL CHARGER IF
4510 *          REPLY = XXXX XXX1
4520 *----------------------------------
4530            LDA REPLY
4540            AND #$01
4550            JSR PRINT.PASS.FAIL
4560 *----------------------------------
4570 *          PRINT ELECTROLYTE STATUS
4580 *          ONLY IF
4590 *          REPLY = XXX1 XXXX
4600 *
4610 *          "ELECTROLYTE"
4620 *             LEVEL: FAIL"
4630 *----------------------------------
4640            BRCLR 4,REPLY,.14
4650  .10       LDA TEXT.11,X
4660            BMI .11
4670            STA PRINT.BUFFER,X
4680            INCX
4690            BRA .10
4700  .11       AND #$7F
4710            STA PRINT.BUFFER,X
4720            JSR PRINT.ONE.LINE
4730  .12       LDA TEXT.12,X
4740            BMI .13
4750            STA PRINT.BUFFER,X
4760            INCX
4770            BRA .12
4780  .13       AND #$7F
4790            STA PRINT.BUFFER,X
4800            JSR PRINT.ONE.LINE
4810 *----------------------------------
4820 *          PRINT RESULTS OF LAST
4830 *          SELF-TEST
4840 *
4850 *          "PER LAST TEST"
4860 *----------------------------------
4870  .14       LDA TEXT.13,X
4880            BMI .15
4890            STA PRINT.BUFFER,X
4900            INCX
4910            BRA .14
4920  .15       AND #$7F
4930            STA PRINT.BUFFER,X
4940            JSR PRINT.ONE.LINE
4950 *----------------------------------
4960 *          PRINT BATTERY STATUS
4970 *
4980 *          "BATTERY:"
4990 *
5000 *----------------------------------
5010  .16       LDA TEXT.14,X
5020            BMI .17
5030            STA PRINT.BUFFER,X
5040            INCX
5050            BRA .16
5060  .17       AND #$7F
5070            STA PRINT.BUFFER,X
5080            INCX
5090 *----------------------------------
5100 *          FAIL IF
5110 *          REPLY = XXXX 11XX
5120 *----------------------------------
5130            LDA REPLY
5140            AND #$0C
5150            STA REPLY
5160            CMP #$0C
5170            BEQ .18
5180            LDA #00
5190            BRA .29
5200  .18       LDA #1
5210  .29       JSR PRINT.PASS.FAIL
5220 *----------------------------------
5230 *          SKIP XFER AND LAMP IF
5240 *          THE BATTERY IS BAD
5250 *----------------------------------
5260            LDA REPLY
5270            CMP #$0C
5280            BEQ .23
5290 *----------------------------------
5300 *          PRINT TRANSFER STATUS
5310 *
5320 *          "TRANSFER:"
5330 *----------------------------------
5340  .19       LDA TEXT.15,X
5350            BMI .20
5360            STA PRINT.BUFFER,X
5370            INCX
5380            BRA .19
5390  .20       AND #$7F
5400            STA PRINT.BUFFER,X
5410            INCX
5420 *----------------------------------
5430 *          FAIL IF P/C BOARD BAD
5440 *          REPLY = XXXX 01XX
5450 *----------------------------------
5460            LDA REPLY
5470            AND #$04
5480            JSR PRINT.PASS.FAIL
5490 *----------------------------------
5500 *          SKIP LAMPS IF BOARD IS BAD
5510 *----------------------------------
5520            BRSET 2,REPLY,.23
5530 *----------------------------------
5540 *          PRINT LAMP STATUS
5550 *
5560 *          "LAMPS:"
5570 *----------------------------------
5580  .21       LDA TEXT.16,X
5590            BMI .22
5600            STA PRINT.BUFFER,X
5610            INCX
5620            BRA .21
5630  .22       AND #$7F
5640            STA PRINT.BUFFER,X
5650            INCX
5660 *----------------------------------
5670 *          FAIL ON BAD BULB IF
5680 *          REPLY = XXXX 10XX
5690 *----------------------------------
5700            LDA REPLY
5710            AND #$08
5720            JSR PRINT.PASS.FAIL
5730  .23       JSR LINE.FEED
5740            RTS
5750
5760 TEXT.14
5770            .AT / BATTERY: /
5780 TEXT.15
5790            .AT / TRANSFER: /
5800 TEXT.16
5810            .AT / LAMPS:    /
5820
5830 ************************************
5840 *          LOAD 16 SPACES TO       *
5850 *          PRINT BUFFER            *
5860 ************************************
5870
5880 CLEAR.BUFFER
```

```
5890            LDA #$20
5900            BRA LOAD.BUFFER
5910
5920 ************************************
5930 *      LOAD 16 PERIODS TO          *
5940 *      PRINT BUFFER                *
5950 ************************************
5960
5970 LOAD.DOTTED.LINE
5980            LDA #$2E
5990            BRA LOAD.BUFFER
6000
6010
6020 ************************************
6030 *      LOAD 16 DASHES TO           *
6040 *      PRINT BUFFER                *
6050 ************************************
6060
6070 LOAD.DASH.LINE
6080            LDA #$2D
6090            BRA LOAD.BUFFER
6100
6110 ************************************
6120 *      FULLS PRINT BUFFER WITH     *
6130 *      ACCUMULATOR CHARACTER       *
6140 ************************************
6150
6160 LOAD.BUFFER
6170            LDX #16
6180 .1         STA PRINT.BUFFER,X
6190            DECX
6200            BPL .1
6210            INCX
6220            RTS
6230
6240 ************************************
6250 *      PRINT THE BUFFER AND        *
6260 *      THEN CLEAR IT. PRINT        *
6270 *      A LINE FEED  X.SAVE = 0     *
6280 ************************************
6290
6300 PRINT.ONE.LINE
6310 *----------------------------------
6320 *      CHECK OUT OF PAPER SWITCH
6330 *----------------------------------
6340 *      LDA PAPER.FLAG
6350 *      BMI .2
6360 *      LDA #SWITCH.STROBE
6370 *      STA PORT.B
6380 *      LDA PORT.A
6390 *      STA A.SAVE
6400 *      LDA #CLEAR.STROBE
6410 *      STA PORT.B
6420 *      BRCLR 7,A.SAVE,,.1
6430 *      JSR PRINT.PAPER.WARNING
6440 *      JSR LINE.FEED
6450 *      JSR LINE.FEED
6460 *      BRA .2
6470 *----------------------------------
6480 .1     JSR PRINT
6490 .2     JSR CLEAR.BUFFER
6500        STX X.SAVE
6510        RTS
6520
6530 ************************************
6540 *      CONVERTS RIGHT NIBBLE       *
6550 *      OF ACCUMULATOR TO ASCII    *
6560 ************************************
6570
6580 RIGHT.NIBBLE
6590            AND #$0F
6600 MAKE.ASCII
6610            CMP #$0A
6620            BCS .1
6630            ADD #7
6640 .1         ADD #$30
6650            RTS
6660
6670 ************************************
6680 *      CONVERTS LEFT NIBBLE        *
6690 *      OF ACCUMULATOR TO ASCII    *
6700 ************************************
6710
6720 LEFT.NIBBLE
6730            LSRA
6740            LSRA
6750            LSRA
6760            LSRA
6770            BRA MAKE.ASCII
6780
6790 ************************************
6800 *      PRINTS PASS FAIL STATUS     *
6810 *      ACCUMULATOR HAS FLAG       *
6820 *      $00 = PASS                  *
6830 *      $01 = FAIL                  *
6840 ************************************
6850
6860 TEXT.18
6870            .AT / PASS/
6880            .AT / FAIL/
6890
6900 PRINT.PASS.FAIL
6910            BEQ .1
6920            LDA #5
6930 .1         STA X.SAVE
6940            STX A.SAVE
6950 .2         LDX X.SAVE
6960            LDA TEXT.18,X
6970            BMI .3
6980            INCX
6990            STX X.SAVE
7000            LDX A.SAVE
7010            STA PRINT.BUFFER,X
7020            INCX
7030            STX A.SAVE
7040            BRA .2
7050 .3         AND #$7F
7060            LDX A.SAVE
7070            STA PRINT.BUFFER,X
7080            JSR PRINT.ONE.LINE
7090            RTS
7100
7110 ************************************
7120 *      PRINT STARTING OR ENDING   *
7130 *      UNIT NUMBER                 *
7140 *      ACCUMULATOR HAS FLAG       *
7150 *      $00 =  START                *
7160 *      $01 =  END                  *
7170 ************************************
7180
7190
7200 TEXT.20
7210            .AT /STARTING AT/
7220            .AT /ENDING AT/
7230
7240 PRINT.START.END
7250            BEQ .1
7260            LDA #11
7270 .1         STA X.SAVE
7280            CLR A.SAVE
7290 *----------------------------------
7300 *      LOAD TEXT
7310 *----------------------------------
```

```
7320  .2    LDX X.SAVE
7330        LDA TEXT.20,X
7340        BMI .3
7350        INCX
7360        STX X.SAVE
7370        LDX A.SAVE
7380        STA PRINT.BUFFER,X
7390        INCX
7400        STX A.SAVE
7410        BRA .2
7420  .3    AND #$7F
7430        LDX A.SAVE
7440        STA PRINT.BUFFER,X
7450        JSR PRINT.ONE.LINE
7460        RTS
7470
7480  ************************************
7490  *       PRINTS ERROR CODE          *
7500  *                                  *
7510  *       "ERROR CODE: XX"           *
7520  *                                  *
7530  ************************************
7540
7550  TEXT.21
7560        .AT /ERROR CODE: /
7570
7580  PRINT.ERROR.CODE
7590  .1    LDA TEXT.21,X
7600        BMI .2
7610        STA PRINT.BUFFER,X
7620        INCX
7630        BRA .1
7640  .2    AND #$7F
7650        STA PRINT.BUFFER,X
7660        INCX
7670        LDA REPLY
7680        STA A.SAVE
7690        JSR LOAD.HEX
7700        JSR PRINT.ONE.LINE
7710        RTS
7720
7730  ************************************
7740  *       PRINTS TICK TIME           *
7750  *       "TICK TIME : XX YY"        *
7760  ************************************
7770
7780  TEXT.22
7790        .AT /TICK TIME:/
7800
7810  PRINT.TICK.TIME
7820  .1    LDA TEXT.22,X
7830        BMI .2
7840        STA PRINT.BUFFER,X
7850        INCX
7860        BRA .1
7870  .2    AND #$7F
7880        STA PRINT.BUFFER,X
7890        INCX
7900        LDA PRESCALE.COUNT
7910        STA A.SAVE
7920        JSR LOAD.HEX
7930        LDA #$20
7940        STA PRINT.BUFFER,X
7950        INCX
7960        LDA TIMER.COUNT
7970        STA A.SAVE
7980        JSR LOAD.HEX
7990        JSR PRINT.ONE.LINE
8000        RTS
8010

8020  ************************************
8030  *       "STATUS IS NORMAL"         *
8040  ************************************
8050
8060  TEXT.23
8070        .AT /STATUS IS NORMAL/
8080
8090  NORMAL.STATUS
8100  .1    LDA TEXT.23,X
8110        BMI .2
8120        STA PRINT.BUFFER,X
8130        INCX
8140        BRA .1
8150  .2    AND #$7F
8160        STA PRINT.BUFFER,X
8170        JSR PRINT.ONE.LINE
8180        JSR LINE.FEED
8190        RTS
8200
8210  ************************************
8220  *       PRINTS WRONG ADDRESS       *
8230  *                                  *
8240  *       "WRONG UNIT    "           *
8250  *       " ANSWERED: XX"            *
8260  *                                  *
8270  ************************************
8280
8290  TEXT.24
8300        .AT /WRONG UNIT/
8310  TEXT.25
8320        .AT / ANSWERED: /
8330
8340  PRINT.ADDRESS.ERROR
8350  .1    LDA TEXT.24,X
8360        BMI .2
8370        STA PRINT.BUFFER,X
8380        INCX
8390        BRA .1
8400  .2    AND #$7F
8410        STA PRINT.BUFFER,X
8420        JSR PRINT.ONE.LINE
8430  .3    LDA TEXT.25,X
8440        BMI .4
8450        STA PRINT.BUFFER,X
8460        INCX
8470        BRA .3
8480  .4    AND #$7F
8490        STA PRINT.BUFFER,X
8500        INCX
8510        LDA ADDRESS
8520        COMA
8530        STA A.SAVE
8540        JSR LOAD.HEX
8550        JSR PRINT.ONE.LINE
8560        JSR LINE.FEED
8570        RTS
8580
8590
8600  ************************************
8610  *       PRINTS XMISSION ERROR      *
8620  *                                  *
8630  *       "XMISSION ERROR"           *
8640  *                                  *
8650  ************************************
8660
8670  TEXT.26
8680        .AT /XMISSION ERROR/
8690
8700  PRINT.XMIT.ERROR
8710  .1    LDA TEXT.26,X
```

```
8720        BMI .2
8730        STA PRINT.BUFFER,X
8740        INCX
8750        BRA .1
8760  .2    AND #$7F 1000
1010 *------------------------------------
1020
1030 ************************************
1040 *                                  *
1050 *       PORTA POLLER PROM          *
1060 *         ($A3B BYTES)             *
1070 *                                  *
1080 *         VERSION 4.0              *
1090 *      AS OF 15 JANUARY 1986       *
1100 *                                  *
1110 ************************************
1111
1112        .LIST OFF
1120
1130        .OR $1000
1140        .TA $2000
1150        .IN PORTA EQUATES
1160
1170 *------------------------------------
1180 *       PROM OPTIONS
1190 *       TEST    FUNCTION
1200 *        1      DISPLAYS SAMPLE
1210 *        2      PRINTS CODES
1220 *------------------------------------
1230 TEST.1           .EQ $00
1240 TEST.2           .EQ $00
1250
1260 ************************************
1270 *                                  *
1280 *     POWER ON ENTRY POINT         *
1290 *     - SET I/O PORT DDR           *
1300 *     - TURN OFF MOTOR             *
1310 *     - TURN OFF ALL DOTS          *
1320 *     - STATE FLAG = COMMAND       *
1330 *     - SCAN RANGE  = ALL          *
1340 *     - UNIT NUMBER = $00          *
1350 *     - MESSAGE     = STATUS       *
1360 *     - 10 MSEC DELAY              *
1370 *     - HOME PRINT HEAD            *
1380 *                                  *
1390 ************************************
1400
1410 COLD.START
1420        LDA #SET.UP.B
1430        STA DDR.B
1440        LDA #WRITE.A
1450        STA DDR.A
1460 *------------------------------------
1470 *      TURN THE MOTOR OFF
1480 *------------------------------------
1490        CLR PORT.A
1500        LDA #DATA.STROBE
1510        STA PORT.B
1520        LDA #CLEAR.STROBE
1530        STA PORT.B
1540 *------------------------------------
1550 *      INITALIZE REGISTERS
1560 *------------------------------------
1570        CLRA
1580        STA STATE.FLAG
1590        STA PAPER.FLAG
1600        JSR LOAD.DOT.LATCH
1610        LDA #LED.OFF

8770        STA PRINT.BUFFER,X
8780        JSR PRINT.ONE.LINE
8790        JSR LINE.FEED
8800        RTS
8810

1620        STA LED.MEMORY
1630        JSR LOAD.LED.LATCH
1640        LDA #XMIT.STATUS
1650        STA MESSAGE
1660        LDA #1
1670        STA PRINT.BUFFER+2
1680        LDA #$FF
1690        STA SCAN.LENGTH
1700 *------------------------------------
1710 *      40 MILLISEC DELAY
1720 *------------------------------------
1730        LDA #10
1740        STA UNIT.NUMBER
1750  .1    DEC STATE.FLAG
1760        BNE .1
1770        DEC UNIT.NUMBER
1780        BNE .1
1790        JSR LINE.FEED
1800
1810 ************************************
1820 *                                  *
1830 *     THE PRIMARY CONTROL LOOP     *
1840 *                                  *
1850 *       THE MACHINE STATE          *
1860 *     DETERMINES THE WORKING       *
1870 *     ROUTINES                     *
1880 *     STATE FLAG CODES             *
1890 *       $00 - GET COMMAND          *
1900 *       $01 - GET SCAN RANGE       *
1910 *       $02 - GET UNIT NO          *
1920 *       $04 - XMIT COMMAND         *
1930 *       $08 - PRINT REPORT         *
1940 *                                  *
1950 ************************************
1960
1970 CONTROL.LOOP
1980        LDA STATE.FLAG
1990        BNE .1
2000        JSR UNIT.COMMAND
2010  .1    CMP #$01
2020        BNE .2
2030        JSR SCAN.RANGE
2040        BRA CONTROL.LOOP
2050  .2    CMP #$02
2060        BNE .3
2070        JSR FIRST.UNIT
2080        BCC CONTROL.LOOP
2090  .3    CMP #$04
2100        BNE .4
2110        JSR XMIT
2120  .4    CMP #$08
2130        BNE CONTROL.LOOP
2140        JSR PRINT.REPORT
2150        BRA CONTROL.LOOP
2160
2170
2180 ************************************
2190 *                                  *
2200 *   GETS THE NUMBER OF THE UNIT    *
2210 *    AT WHICH THE SCAN STARTS      *
2220 *                                  *
2230 *   LEFT SHIFTS KEYSTROKE "0"      *
2240 *    THRU "F" INTO STARTING        *
2250 *    UNIT NUMBER                   *
```

```
2260  *                                    *
2270  *    RETURNS WHEN "ENTER" IS         *
2280  *         PRESSED                    *
2290  *                                    *
2300  **************************************
2310
2320  *-----------------------------------
2330  *    BITS 0 THRU 3 ARE SWAPPED
2340  *    LEFT TO RIGHT 0101=1010
2350  *-----------------------------------
2360  TABLE
2370         .HS 040800
2380         .HS 0A020C
2390         .HS 010E06
2400         .HS 0D0509
2410         .HS 070B03
2420         .HS 00000F
2430  *-----------------------------------
2440  FIRST.UNIT
2450
2460  *-----------------------------------
2470  *    START WITH "OFF" LED
2480  *    READY TO BE TURNED OFF
2490  *-----------------------------------
2500         LDA #1
2510         STA PRINT.BUFFER+2
2520         LDA #LED.OFF
2530         STA LED.MEMORY
2540  *-----------------------------------
2550  *    LOOP TILL "ENTER" OR
2560  *    "QUIT" IS PRESSED
2570  *-----------------------------------
2580  .1     JSR KEYPAD.HANDLER
2590         BCC .3
2600         LDA STATE.FLAG
2610         BEQ .9
2620         LDA A.SAVE
2630         CMP #$01
2640         BNE .1
2650  *-----------------------------------
2660  *    FIX UP LAST NUMBER
2670  *-----------------------------------
2680         LDA UNIT.NUMBER
2690         DECA
2700         STA LAST.UNIT
2710  *-----------------------------------
2720  *    PRINT
2730  *       UNIT NUMBER
2740  *       LINE FED
2750  *-----------------------------------
2760         JSR PRINT.NUMBER
2770         JSR LINE.FEED
2780  *-----------------------------------
2790  *    WAIT FOR "ENTER" AGAIN
2800  *       BUMP STATE => $04
2810  *       LEDS OFF
2820  *       LINE FEED
2830  *-----------------------------------
2840  .2     JSR KEYPAD.HANDLER
2850         BCC .2
2860         LDA STATE.FLAG
2870         BEQ .9
2880         LDA A.SAVE
2890         CMP #01
2900         BNE .2
2910         LDA #LED.OFF
2920         STA LED.MEMORY
2930         JSR LOAD.LED.LATCH
2940         LSL STATE.FLAG
2950         JSR LINE.FEED
2960         RTS

2970  *-----------------------------------
2980  *    COVERTS MATRIX POSITION
2990  *    TO A HEX NUMBER VIA TABLE
3000  *    INDEX = 3*ROW + COLUMN
3010  *-----------------------------------
3020  .3     CLR X.SAVE
3030  .4     LSR A.SAVE
3040         BCS .5
3050         LDA #3
3060         ADC X.SAVE
3070         STA X.SAVE
3080         BRA .4
3090  .5     LSR B.SAVE
3100  .6     LSR B.SAVE
3110         BCS .7
3120         INC X.SAVE
3130         BRA .6
3140  .7     LDX X.SAVE
3150  *-----------------------------------
3160  *    GET THE NUMBER AND LEFT
3170  *    SHIFT IT INTO LSB
3180  *    THEN BACK TO THE KEYPAD
3190  *-----------------------------------
3200         LDA #4
3210         STA A.SAVE
3220         LDA TABLE,X
3230  .8     LSRA
3240         ROL UNIT.NUMBER
3250         DEC A.SAVE
3260         BNE .8
3270         BRA .1
3280  .9     JSR LINE.FEED
3290         RTS
3300
3310  **************************************
3320  *                                    *
3330  *    SCAN KEYPAD TILL "ENTER" OR     *
3340  *    "QUIT" IS PRESSED - ENTER       *
3350  *    "ONE" OR "ALL" KEY STROKES      *
3360  *    INTO SCAN RANGE                 *
3370  *       $01 = ONE UNIT               *
3380  *       $FF = ALL UNITS              *
3390  *                                    *
3400  **************************************
3410
3420  SCAN.RANGE
3430  *-----------------------------------
3440  *    START WITH "ALL" LED
3450  *    READY TO BE TURNED OFF
3460  *-----------------------------------
3470         LDA #1
3480         STA PRINT.BUFFER+2
3490         LDA #LED.ALL
3500         STA LED.MEMORY
3510  *-----------------------------------
3520  *    LOOP TILL "ENTER" OR
3530  *    "QUIT" PRESSED
3540  *-----------------------------------
3550  .1     JSR KEYPAD.HANDLER
3560         BCC .1
3570         LDA STATE.FLAG
3580         BEQ .7
3590         LDA A.SAVE
3600         CMP #$01
3610         BNE .4
3620  *-----------------------------------
3630  *    BUMP STATE NUMBER => 02
3640  *    PRINT SCAN RANGE
3650  *-----------------------------------
3660  .2     LSL STATE.FLAG
```

```
3670            JSR PRINT.RANGE
3680 .3         RTS
3690 *-----------------------------------
3700 *       IF KEY STROKE WAS "ONE"
3710 *       OR "ALL" ENTER IT
3720 *-----------------------------------
3730 .4         CMP #$04
3740            BNE .5
3750            LDA #$FF
3760            BRA .6
3770 .5         CMP #$02
3780            BNE .1
3790            LDA #1
3800 *-----------------------------------
3810 *       STORE SCAN LENGTH AND
3820 *       RETURN
3830 *-----------------------------------
3840 .6         STA SCAN.LENGTH
3850            BRA .2
3860 .7         JSR LINE.FEED
3870            RTS
3880
3890 ***********************************
3900 *                                 *
3910 *   SCAN KEYPAD TILL "ENTER" OR   *
3920 *   "QUIT" IS PRESSED - ENTER     *
3930 *   "STATUS", "5 MIN" AND         *
3940 *   "30 MIN" KEY STROKES INTO     *
3950 *   "MESSAGE"                     *
3960 *                                 *
3970 ***********************************
3980
3990 UNIT.COMMAND
4000
4010 *-----------------------------------
4020 *       START WITH "30 MIN" LED
4030 *       READY TO BE TURNED OFF
4040 *-----------------------------------
4050            LDA #1
4060            STA PRINT.BUFFER+2
4070            LDA #LED.30.MIN
4080            STA LED.MEMORY
4090 *-----------------------------------
4100 *       LOOP TILL "ENTER" OR
4110 *       A COMMAND IS PRESSED
4120 *-----------------------------------
4130 .1         JSR KEYPAD.HANDLER
4140            BCC .1
4150            CMP #$02
4160            BEQ .1
4170            LDA A.SAVE
4180            CMP #$01
4190            BNE .4
4200 *-----------------------------------
4210 *       BUMP STATE NUMBER => 01
4220 *       AND PRINT COMMAND
4230 *-----------------------------------
4240 .2         INC STATE.FLAG
4250            JSR PRINT.COMMAND
4260 .3         RTS
4270 *-----------------------------------
4280 *       "STATUS", "5 MIN" OR
4290 *       "30 MIN" PRESSED ?
4300 *-----------------------------------
4310 .4         CMP #$08
4320            BNE .5
4330            LDA #XMIT.STATUS
4340            BRA .7
4350 .5         CMP #$10
4360            BNE .6
4370            LDA #XMIT.5.MIN.TEST
4380            BRA .7
4390 .6         CMP #$20
4400            BNE .1
4410            LDA #XMIT.30.MIN.TEST
4420 *-----------------------------------
4430 *       STORE SELECTED COMMAND
4440 *       RETURN
4450 *-----------------------------------
4460 .7         STA MESSAGE
4470            BRA .2
4480
4490 ***********************************
4500 *                                 *
4510 *   SENDS "MESSAGE" AND           *
4520 *       "UNIT NUMBER"             *
4530 *   PRINTS "REPLY" IF NO          *
4540 *       ERROR WAS DETECTED        *
4550 *   PRINTS THE REPLY ERROR        *
4560 *       IF SINGLE UNIT SCAN       *
4570 *                                 *
4580 ***********************************
4590
4600 XMIT
4610 *-----------------------------------
4620 *       IF "QUIT" IS PRESSED:
4630 *       CURRENT UNIT => LAST UNIT
4640 *       EXIT VIA PRINT REPORT
4650 *-----------------------------------
4660            LDA #$02
4670            STA B.SAVE
4680            JSR READ.SWITCH.MATRIX
4690            CMP #$20
4700            BNE .1
4710            LDA UNIT.NUMBER
4720            STA LAST.UNIT
4730            BRA .4
4740 *-----------------------------------
4750 *       SEND THE MESSAGE
4760 *-----------------------------------
4770 .1         JSR TRANSMITT
4780            JSR RECEIVE
4790 *-----------------------------------
4800 *       TEST LOOP TO VIEW SAMPLE
4810 *       TIMING - ENABLED WHEN
4820 *       TEST 1 = $01
4830 *-----------------------------------
4840            .DO TEST.1
4850            LDA #$FF
4860            STA X.SAVE
4870            JSR TICK.DELAY
4880            LDA #$20
4890            STA X.SAVE
4900            JSR TICK.DELAY
4910            BRA XMIT
4920            .FIN
4930 *-----------------------------------
4940 *       LOOK FOR A REPLY
4950 *-----------------------------------
4960            LDA REPLY
4970            BPL .4
4980 *-----------------------------------
4990 *       NO REPLY = $80
5000 *-----------------------------------
5010            CMP #$80
5020            BNE .4
5030 *-----------------------------------
5040 *       SINGLE UNIT SCAN
5050 *-----------------------------------
5060            LDA SCAN.LENGTH
5070            BPL .4
```

```
5080 *---------------------------------
5090 *       END OF AN ALL UNITS SCAN
5100 *---------------------------------
5110         LDA UNIT.NUMBER
5120         CMP LAST.UNIT
5130         BEQ .4
5140 *---------------------------------
5150 *       NO REPLY - TRY NEXT UNIT
5160 *       -    BLINK "ALL UNITS" LED
5170 *            INCRE UNIT NUMBER
5180 *---------------------------------
5190         LDA #LED.OFF
5200         CMP LED.MEMORY
5210         BNE .2
5220         LDA #LED.ALL
5230  .2     STA LED.MEMORY
5240         JSR LOAD.LED.LATCH
5250         INC UNIT.NUMBER
5260         LDA #$04
5270         BRA .5
5280 *---------------------------------
5290 *       PRINT REPORT IF:
5300 *       1. GOT A REPLY
5310 *       2. NO REPLY TO A SINGLE
5320 *          UNIT SCAN
5330 *       3. NO REPLY TO LAST UNIT
5340 *          ON AN ALL UNITS SCAN
5350 *       4. WRONG ADDRESS
5360 *       5. XMISSION ERROR
5370 *---------------------------------
5380  .4     LDA #$08
5390  .5     STA STATE.FLAG
5400         RTS
5410
5420 **********************************
5430 *                                *
5440 *       PRINTS THE REPORT        *
5450 *                                *
5460 **********************************
5470
5480 PRINT.REPORT
5490         JSR CLEAR.LINE
5500 *---------------------------------
5510 *       ALL UNIT SCAN PROCCESSING
5520 *       1. CLEAR LINE IF LAST
5530 *          UNIT
5540 *       2. PRINT LINE NUMBER IF
5550 *          A REPLY WAS RECIEVED
5560 *---------------------------------
5570         LDA SCAN.LENGTH
5580         BPL .2
5590         LDA UNIT.NUMBER
5600         CMP LAST.UNIT
5610         BNE .1
5620         LDA REPLY
5630         CMP #$80
5640         BEQ .6
5650  .1     JSR PRINT.NUMBER
5660 *---------------------------------
5670 *       PRINT "NO REPLY" IF
5680 *          REPLY = $80
5690 *---------------------------------
5700  .2     LDA REPLY
5710         CMP #$80
5720         BNE .3
5730         JSR PRINT.NO.REPLY
5740         BRA .6
5750 *---------------------------------
5760  .3     CMP #$BD
5770         BNE .31

5780 *---------------------------------
5790 *       WRONG ADDRESS REPLY
5800 *---------------------------------
5810         JSR PRINT.ADDRESS.ERROR
5820         BRA .5
5830 *---------------------------------
5840 *       PRINT "XMISSION ERROR"
5850 *---------------------------------
5860  .31    BIT #$80
5870         BEQ .33
5880         JSR PRINT.XMIT.ERROR
5890         BRA .5
5900 *---------------------------------
5910 *       PRINT STATUS OR TEST REPLY
5920 *---------------------------------
5930  .33    LDA MESSAGE
5940         CMP #XMIT.STATUS
5950         BNE .4
5960         JSR PRINT.STATUS
5970         BRA .5
5980  .4     JSR PRINT.START.TEST.REPLY
5990 *---------------------------------
6000 *       ALL UNITS SCAN
6010 *---------------------------------
6020  .5     LDA SCAN.LENGTH
6030         BPL .6
6040 *---------------------------------
6050 *       YES - CHECK FOR LAST UNIT
6060 *             IF NOT INCRE ADDRESS
6070 *---------------------------------
6080         LDA UNIT.NUMBER
6090         CMP LAST.UNIT
6100         BEQ .6
6110         INC UNIT.NUMBER
6120         LDA #$04
6130         BRA .7
6140 *---------------------------------
6150 *       LAST UNIT -
6160 *       PRINT ACCEPTANCE FORM AND
6170 *       RETURN TO STATE 0
6180 *---------------------------------
6190  .6     JSR PRINT.ACCEPTANCE
6200         CLRA
6210  .7     STA STATE.FLAG
6220         RTS
6230
6240 **********************************
6250 *                                *
6260 * SCANS THE KEYBOARD AND BLINKS  *
6270 *   THE ENABLED LED ON OR OFF    *
6280 *   EVERY 1/4 SECOND. KEY IS     *
6290 *   DEBOUNCED FOR 100 MILLISEC   *
6300 *                                *
6310 *   FEED  => ADVANCES PAPER      *
6320 *            ONE LINE AND        *
6330 *            CONTINUES SCAN      *
6340 *   QUIT  => SETS STATE TO 0     *
6350 *            RETURNS WITH        *
6360 *            CARRY SET           *
6370 *   ENTER => RETURNS WITH        *
6380 *            CARRY SET           *
6390 *   0 - F => RETURNS WITH        *
6400 *            CARRY CLEAR         *
6410 *                                *
6420 **********************************
6430
6440 KEYPAD.HANDLER
6450         CLR PRINT.BUFFER+3
6460  .1     DEC PRINT.BUFFER+2
6470         BNE .2
6480 *---------------------------------
```

```
6490 *           TIME TO BLINK THE LED
6500 *----------------------------------
6510         LDA #50
6520         STA PRINT.BUFFER+2
6530         JSR LED.HANDLER
6540 *----------------------------------
6550 *           SCAN THE SWITCH AND SAVE
6560 *           THE RESULTS
6570 *----------------------------------
6580  .2      JSR SCAN.SWITCH.MATRIX
6590         LDA A.SAVE
6600         STA PRINT.BUFFER
6610         LDA B.SAVE
6620         STA PRINT.BUFFER+1
6630 *----------------------------------
6640 *           167 PASS THRU A 6 USEC
6650 *           INNER LOOP = 1.0 MSEC
6660 *           10 PASSES THRU A 1.0 MSEC
6670 *           OUTER LOOP = 10.0 MSEC
6680 *----------------------------------
6690         LDA #10
6700         STA A.SAVE
6710  .3      LDA #167
6720  .4      DECA
6730         BNE .4
6740         DEC A.SAVE
6750         BNE .3
6760 *----------------------------------
6770 *           SCAN AGAIN - BOTH ROW
6780 *           AND COLUMN MUST MATCH
6790 *----------------------------------
6800         JSR SCAN.SWITCH.MATRIX
6810         LDA B.SAVE
6820         CMP PRINT.BUFFER+1
6830         BNE .1
6840         LDA A.SAVE
6850         CMP PRINT.BUFFER
6860         BNE .1
6870 *----------------------------------
6880 *           MAKE SURE ITS NOT THE
6890 *           LAST KEY STROKE
6900 *----------------------------------
6910         LDA A.SAVE
6920         BNE .5
6930         LDA #$FF
6940         STA PRINT.BUFFER+3
6950         BRA .1
6960  .5      LDA PRINT.BUFFER+3
6970         BEQ .1
6980 *----------------------------------
6990 *           CHECK THE BOTTOM ROW
7000 *----------------------------------
7010         LDA A.SAVE
7020         CMP #$20
7030         BNE .9
7040 *----------------------------------
7050 *           LOOK FOR "FEED"
7060 *----------------------------------
7070         LDA B.SAVE
7080         CMP #$04
7090         BNE .6
7100         JSR LINE.FEED
7110         BRA .1
7120 *----------------------------------
7130 *           LOOK FOR "QUIT"
7140 *----------------------------------
7150  .6      CMP #$02
7160         BNE .7
7170         CLR STATE.FLAG
7180         BRA .8
7190 *----------------------------------
7200 *           LOOK FOR "30 MIN"
7210 *           IF NOT IT MUST BE "F"
7220 *----------------------------------
7230  .7      CMP #$01
7240         BNE .10
7250  .8      SEC
7260         RTS
7270 *----------------------------------
7280 *           LOOK FOR 0 TO E
7290 *----------------------------------
7300  .9      LDA B.SAVE
7310         CMP #$01
7320         BEQ .8
7330  .10     CLC
7340         RTS
7350
7360 ***********************************
7370 *                                 *
7380 *       PRINTS A BLANK LINE       *
7390 *           (LINE FEED)           *
7400 *                                 *
7410 ***********************************
7420
7430 LINE.FEED
7440
7450 *----------------------------------
7460 *        WAIT TILL POWER SUPPLY
7470 *        HAS RECOVERED TO 38V
7480 *----------------------------------
7490  .1      BRSET 7,PORT.B,.1
7500         LDA #WRITE.A
7510         STA DDR.A
7520         JSR TURN.MOTOR.ON
7530         JSR TURN.MOTOR.OFF
7540         LDA #READ.A
7550         STA DDR.A
7560         RTS
7570
7580 ***********************************
7590 *                                 *
7600 *       READS THE MATRIX KEYPAD   *
7610 *                                 *
7620 ***********************************
7630
7640 *      $08    $04    $02    $01
7650 *----------------------------------
7660 * $01   0     1      2     ENTER -
7670 * $02   3     4      5     ONE
7680 * $04   6     7      8     ALL
7690 * $08   9     A      B     STATUS
7700 * $10   C     D      E     5 MIN
7710 * $20   F    FEED   QUIT   30 MIN
7720 *----------------------------------
7730 SCAN.SWITCH.MATRIX
7740         LDA #$01
7750         STA B.SAVE
7760         JSR READ.SWITCH.MATRIX
7770         BNE .1
7780         LSL B.SAVE
7790         JSR READ.SWITCH.MATRIX
7800         BNE .1
7810         LSL B.SAVE
7820         JSR READ.SWITCH.MATRIX
7830         BNE .1
7840         LSL B.SAVE
7850         JSR READ.SWITCH.MATRIX
7860  .1      RTS
7870
7880 READ.SWITCH.MATRIX
```

```
7890  *---------------------------------
7900  *      SET PORT A TO WRITE
7910  *      ENABLE A SWITCH COLUMN
7920  *---------------------------------
7930  .1      LDA  #WRITE.A
7940          STA  DDR.A
7950          LDA  B.SAVE
7960          COMA
7970          AND  #$6F
7980          STA  PORT.A
7990          LDA  #DATA.STROBE
8000          STA  PORT.B
8010          LDA  #CLEAR.STROBE
8020          STA  PORT.B
8030  *---------------------------------
8040  *      SET PORT A TO READ
8050  *      READ THE 6 SWITCH ROWS
8060  *---------------------------------
8070          LDA  #READ.A
8080          STA  DDR.A
8090          LDA  #SWITCH.STROBE
8100          STA  PORT.B
8110          LDA  PORT.A
8120          AND  #$3F
8130          STA  A.SAVE
8140          LDA  #CLEAR.STROBE
8150          STA  PORT.B
8160          LDA  A.SAVE
8170          RTS
8180
8190  ***********************************
8200  *                                 *
8210  *   MANAGES THE BLINKING OF THE   *
8220  *   LEDS DEPENDING UPON THE       *
8230  *   CURRENT STATE                 *
8240  *     2 = ZERO/OFF                *
8250  *     1 = ONE/ALL                 *
8260  *     0 = STATUS/5 MIN/30 MIN     *
8270  *                                 *
8280  ***********************************
8290
8300  LED.HANDLER
8310          LDA  STATE.FLAG
8320          CMP  #2
8330          BNE  .1
8340  *---------------------------------
8350  *      STATE 0
8360  *---------------------------------
8370          LDA  #LED.OFF
8380          CMP  LED.MEMORY
8390          BNE  .5
8400          LDA  #LED.ENTER
8410          BRA  .5
8420  *---------------------------------
8430  *      STATE 1
8440  *---------------------------------
8450  .1      CMP  #1
8460          BNE  .2
8470          LDA  #LED.ONE
8480          CMP  LED.MEMORY
8490          BNE  .5
8500          LDA  #LED.ALL
8510          BRA  .5
8520  *---------------------------------
8530  *      STATE 2
8540  *---------------------------------
8550  .2      LDA  LED.MEMORY
8560          CMP  #LED.STATUS
8570          BNE  .3
8580          LDA  #LED.5.MIN
8590          BRA  .5
8600  .3      CMP  #LED.5.MIN
8610          BNE  .4
8620          LDA  #LED.30.MIN
8630          BRA  .5
8640  .4      LDA  #LED.STATUS
8650  *---------------------------------
8660  *      TURN ON THE LED
8670  *      ALWAY RETURN PORT B TO
8680  *      READ MODE
8690  *---------------------------------
8700  .5      STA  LED.MEMORY
8710
8720  ***********************************
8730  *                                 *
8740  ***********************************
8750
8760  LOAD.LED.LATCH
8770          LDA  #WRITE.A
8780          STA  DDR.A
8790          LDA  LED.MEMORY
```

Having described the invention, what is claimed is:

1. A method of communicating on a communication bus with at least one remote unit, including the step of determining the transmission speed of the remote unit by the remote unit transmitting a start of message header onto the communication bus, wherein the state of the bus is in either a logic "one" or a logic "zero" state, comprising the sub-steps of:

(1) determining when the communication bus makes a transition from a logic zero state to a logic one state;

(2) sampling the state of the bus at least one additional time during a first predetermined length of time to determine if the bus remains in a logic one state;

(3) continually determining the state of the bus after the first predetermined length of time until a logic one to logic zero transition is detected;

(4) determining the length of time after the first predetermined length of time in which the bus was in a logic one state prior to its transition to a logic zero state;

(5) determining the actual transmission period by adding the first predetermined length of time with the period of time determined in step 4 so as to yield the length of time for the logic one state associated with a start of message header; and (6) adjusting subsequent sampling of the bus so as to be a fraction of the determined actual transmission period.

2. A method of communicating as defined in claim 1, wherein the adjusted length of time between subsequent samples is denoted as an actual "tick time" and wherein the first predetermined length of time is equal to the nominal length of fourteen tick times, and wherein the actual transmission period determined in step 5 of claim 1 is equal to twenty-eight actual tick times.

3. A method of communicating as defined in claim 2, wherein the subsequent sampling of the bus is to determine the presence of data "0" bits and data "1" bits, wherein a data "0" bit comprises a logic one state for K actual tick times, where K is an integer at least equal to L, a second integer, and further comprises a logic zero state for M actual tick times, where M is an integer at least equal to N, a fourth integer, and wherein a data "1" bit comprises a logic one state for P actual tick times, where P is an integer at least equal to L, and further comprises a logic zero state for Q actual tick times, where Q is an integer at least equal to N, and further wherein K is not equal to P and M is not equal to Q.

4. A method of communicating as defined in claim 3, further comprising the step of determining a logic zero to logic one transition denoting the start of a data "0" bit or a data "1" bit and wherein the subsequent sampling times associated with determining the presence of a data "0" bit or data "1" bit are based upon the determination of the logic zero to logic one transition.

5. A method of communicating as defined in claim 4, wherein each sample comprises a plurality of readings of the communication bus, wherein at least a majority of these readings must be at a particular logic level for that logic level to be determined valid for that sample.

6. A method of communicating as defined in claim 5, wherein the plurality of reading is equal to four.

7. A method of communicating as defined in claim 6, wherein the logic zero to logic one transition is considered determined when at least three consecutive readings of the communication bus have the following states: logic zero, logic one and logic one.

8. A method of communicating as defined in claim 3, wherein K is four, M is twelve, P is twelve and Q is four.

9. A method of communicating as defined in claim 8, wherein the start of message header is required to have a logic zero state for a predetermined number of actual tick times following the logic one state.

10. A method of communicating as defined in claim 9, wherein the determination step in claim 1, step 4 is completed prior to completion of the time that the start of message header is maintained in the logic zero state so as to provide sufficient time for sampling the start of message header to insure that it is in a logic zero state for said predetermined number of actual tick times.

11. A communication method as defined in claim 10, wherein the remote unit comprises self-testing capability and further wherein the communication method incorporates a host communicator for interrogating any remote unit so as to inquire as to its status as well as to request the initiation of its self-testing capabilities.

12. A communication method as defined in claim 11, wherein the self-testing capability of each remote unit comprises a five minute self-discharge test and a thirty minute self-discharge test.

13. A communication method as defined in claim 12, wherein the status of the remote unit includes information concerning a battery charger, the battery operation, the transfer circuitry, the lamp condition, and the electrolyte condition.

14. A method of communicating as defined in claim 1, wherein the logic zero to logic one transition is considered determined when at least three consecutive readings of the communication bus have the following status: logic zero, logic one and logic one.

15. A communicator for communicating on a communication bus with at least one remote unit, said communicator including means, connectable to the communication bus, for receiving information on the bus and for transmitting information onto the bus, said receiving means including means for determining the transmission speed of the remote unit by the remote unit transmitting a start of message header onto the communication bus, wherein the state of the bus is in either a logic "one" or a logic "zero" state, wherein the transmission determining means comprises:

(1) means for determining when the communication bus makes a transition from a logic zero state to a logic one state;
(2) means for sampling the state of the bus at least one additional time during a first predetermined length of time to determine if the bus remains in a logic one state;
(3) means for continually determining the state of the bus after the first predetermined length of time until a logic one to logic zero transition is detected;
(4) means for determining the length of time after the first predetermined length of time in which the bus was in a logic one state prior to its transition to a logic zero state;
(5) means for determining the actual transmission period by adding the first predetermined length of time with the period of time determined by element 4 so as to yield the length of time for the logic one state associated with a start of message header; and
(6) means for adjusting subsequent sampling of the bus so as to be a fraction of the determined actual transmission period.

16. A communicator as defined in claim 15, wherein the adjusted length of time between subsequent samples is denoted as an actual "tick time" and wherein the first predetermined length of time is equal to the nominal length of fourteen tick times, and wherein the actual transmission period determined by element 5 of claim 15 is equal to twenty-eight actual tick times.

17. A communicator as defined in claim 16, wherein the subsequent sampling of the bus is to determine the presence of data "0" bits and data "1" bits, wherein a data "0" bit comprises a logic one state for K actual tick times, where K is an integer at least equal to L, a second integer, and further comprises a logic zero state for M actual tick times, where M is an integer at least equal to N, a fourth integer, and wherein a data "1" bit comprises a logic one state for P actual tick times, where P is an integer at least equal to L, and further comprises a logic zero state for Q actual tick times, where Q is an integer at least equal to N, and further wherein K is not equal to P and M is not equal to Q.

18. A communicator as defined in claim 17, further comprising means for determining a logic zero to logic one transition denoting the start of a data "0" bit or a data "1" bit and wherein the subsequent sampling times associated with determining the presence of a data "0" bit or data "1" bit are based upon the determination of the logic zero to logic one transition.

19. A communicator as defined in claim 18, wherein each sample comprises a plurality of readings of the communication bus, and wherein at least a majority of these readings must be at a particular logic level for that logic level to be determined valid for that sample.

20. A communicator as defined in claim 19, wherein the plurality of reading is equal to four.

21. A communicator as defined in claim 20, wherein the logic zero to logic one transition is considered determined when at least three consecutive readings of the communication bus have the following states: logic zero, logic one and logic one.

22. A communicator as defined in claim 17, wherein K is four, M is twelve, P is twelve and Q is four.

23. A communicator as defined in claim 22, wherein the start of message header is required to have a logic zero state for a predetermined number of actual tick times following the logic one state.

24. A communicator as defined in claim 23, wherein the means for determining the length of time after the first predetermined length of time in which the bus was in a logic one state prior to its transition to a logic zero state is completed prior to completion of the time that the start of message header is maintained in the logic zero state so as to provide sufficient time for sampling the start of message header to insure that it is in a logic zero state for said predetermined number of actual tick times.

25. A communication system comprising a communicator as defined in claim 24, and further comprising at least one remote unit having means, connectable to the communication bus, for receiving information on the bus and for transmitting information onto the bus, each remote unit further comprising means for performing self-testing and for annunciating its status and further wherein the communicator comprises means for interrogating any remote unit so as to inquire as to its status as well as means for requesting the initiation of its self-testing capabilities.

26. A communication system as defined in claim 25, wherein each remote unit's means for performing self-testing comprises means for performing a five minute self-discharge test and a thirty minute self-discharge test.

27. A communication system as defined in claim 26, wherein each remote unit includes a battery with an electrolyte, a battery charger, transfer circuitry, and at least one lamp, and wherein the status annunciating means of each remote unit includes information concerning the battery charger, the battery operation, the transfer circuitry, the lamp condition, and the electrolyte condition of the remote unit.

28. A communicator as defined in claim 15, wherein the means for determining when the communication bus makes a transition from a logic zero state to a logic one state comprises means for determining when at least three consecutive readings of the communication bus have the following status: logic zero, logic one and logic one.

29. A communication system comprising a communicator, a communication bus, and at least one remote unit, said communicator including means, connectable to the communication bus, for receiving information on the bus and for transmitting information onto the bus, and further wherein each remote unit has means, connectable to the communication bus, for receiving information on the bus and for transmitting information onto the bus, said receiving means of the communicator including means for determining the transmission speed of the remote unit by the remote unit transmitting a start of message header onto the communication bus, wherein the state of the bus in in either a logic "one" or a logic "zero" state, wherein the transmission determining means of the communicator comprises:
(1) means for determining when the communication bus makes a transition from a logic zero state to a logic one state;
(2) means for sampling the state of the bus at least one additional time during a first predetermined length of time to determine if the bus remains in a logic one state;
(3) means for continually determining the state of the bus after the first predetermined length of time until a logic one to logic zero transition is detected;
(4) means for determining the length of time after the first predetermined length of time in which the bus was in a logic one state prior to its transition to a logic zero state;
(5) means for determining the actual transmission period by adding the first predetermined length of time with the period of time determined by element 4 so as to yield the length of time for the logic one state associated with a start message header; and
(6) means for adjusting subsequent sampling of the bus so as to be a fraction of the determined actual transmission period.

30. A communication system as defined in claim 29, wherein the adjusted length of time between subsequent samples is denoted as an actual "tick time" and wherein the first predetermined length of time is equal to the nominal length of fourteen tick times, and wherein the actual transmission period determined by element 5 of claim 29 is equal to twenty-eight actual tick times.

31. A communication system as defined in claim 30, wherein the subsequent sampling of the bus is to determine the presence of data "0" bits and data "1" bits, wherein a data "0" bit comprises a logic one state for K actual tick times, where K is an integer at least equal to L, a second integer, and further comprises a logic zero state for M actual tick times, where M is an integer at least equal to N, a fourth integer, and wherein a data "1" bit comprises a logic one state for P actual tick times, where P is an integer at least equal to L, and further comprises a logic zero state for Q actual tick times, where Q is an integer at least equal to N, and further wherein K is not equal to P and M is not equal to Q.

32. A communication system as defined in claim 31, wherein the communicator further comprises means for determining a logic zero to logic one transition denoting the start of a data "0" bit or a data "1" bit and wherein the subsequent sampling times associated with determining the presence of a data "0" bit or data "1" bit are based upon the determination of the logic zero to logic one transition.

33. A communication system as defined in claim 32, wherein each sample comprises a plurality of readings of the communication bus, and wherein at least a majority of these readings must be at a particular logic level for that logic level to be determined valid for that sample.

34. A communication system as defined in claim 33, wherein the plurality of reading is equal to four.

35. A communication system as defined in claim 34, wherein the logic zero to logic one transition is considered determined when at least three consecutive readings of the communication bus have the following states: logic zero, logic one and logic one.

36. A communication system as defined in claim 35, wherein K is four, M is twelve, P is twelve and Q is four.

37. A communication system as defined in claim 36, wherein the start of message header is required to have a logic zero state for a predetermined number of actual tick times following the logic one state.

38. A communication system as defined in claim 37, wherein the communicator means for determining the length of time after the first predetermined length of time in which the bus was in a logic one state prior to its transition to a logic zero state is completed prior to completion of the time that the start of message header is maintained in the logic zero state so as to provide sufficient time for sampling the start of message header to insure that it is in a logic zero state for said predetermined number of actual tick times.

* * * * *